F389D XR 3,588,700

[redacted] [redacted] [redacted]

[11] 3,588,700

[72] Inventors Haruo Shiki;
Takaaki Taniya, Tokyo, Japan
[21] Appl. No. 808,277
[22] Filed Mar. 18, 1969
[45] Patented June 28, 1971
[73] Assignee Nippon Electric Company, Limited
Tokyo-to, Japan
[32] Priority Mar. 20, 1968
[33] Japan
[31] 43/18089

[54] FAILURE COMPENSATING DROP CHANNEL MICROWAVE RADIO RELAY SYSTEM

8 Claims, 3 Drawing Figs.

[52] U.S. Cl. 325/2, 178/5.6, 179/15BD, 325/3, 325/5, 325/49
[51] Int. Cl. H04b 7/14, H04j 1/10
[50] Field of Search 179/15 (DC) (APR), 516.15; 325/1, 2, 3, 5, 49, 50; 178/5.6

[56] References Cited

UNITED STATES PATENTS

| | | | |
|---|---|---|---|
| 2,892,930 | 6/1959 | Magnuski et al. | 325/1X |
| 2,907,874 | 10/1959 | Halvorson | 179/15X |
| 3,040,130 | 6/1962 | Hughes | 179/15X |
| 3,111,624 | 11/1963 | Farkas | 325/2 |

*Primary Examiner*—Benedict V. Safourek
*Attorney*—Marn and Jangarathis

ABSTRACT: A microwave radio relay system is provided in accordance with the teachings of the present invention wherein the transmission quality of television signals being transmitted in a spare radio channel is maintained and the distortion thereof due to the erroneous insertion of telephony signals therein is completely avoided. In one embodiment of the present invention a microwave radio relay system including first and second baseband terminal stations and at least one leak-insertion station is provided with at least one television signal transmitting radio channel, at least one telephony signal transmitting radio channel and at least one spare radio channel capable of replacing either of said transmitting radio channels upon the detection of a failure therein. Each of said radio channels is directed for transmission in one direction and in addition, at least one telephony signal radio channel and at least one spare radio channel is provided for oppositely directed transmission. The leak-insertion station is provided with branching out and insertion capabilities for telephony signals in either transmission direction; however, the insertion and branching out of telephony signals being transmitted in said one direction is accomplished only in conjunction with the radio channels directed for transmission in the opposite direction. Thus, telephony signals for insertion are never introduced directly into radio channels directed in said one direction but are only inserted at a point where telephony signals are normally provided therefor. Accordingly, the erroneous insertion of telephony signals in a spare radio channel transmitting television signals cannot be caused by faulty switching.

INVENTORS
Haruo Shiki
Takaaki Taniya
BY
Marn & Jangarathis
ATTORNEYS

INVENTORS
Haruo Shiki
Takaaki Taniya
BY
Marn & Jangarathis
ATTORNEYS

INVENTORS
Haruo Shiki
Takaaki Taniya
BY
Marn & Jangarathis
ATTORNEYS

FAILURE COMPENSATING DROP CHANNEL MICROWAVE RADIO RELAY SYSTEM

This invention relates to telecommunication systems for the transmission of multiplex information and more particularly to improved radio relay systems which include both leak-insertion stations and baseband terminal stations.

Radio relay systems presently utilized to link many cities and towns in an integrated microwave communications network may take the form of a demodulation relay system wherein a plurality of relay stations are interposed along the transmission path of paths and the telephony and television signals to be transmitted are demodulated at each relay station and thereafter used to modulate a carrier signal which is retransmitted. Such radio relay systems have proven highly successful in operation and are particularly advantageous because the demodulated signals present at each relay station render the overall radio relay system especially well suited for the convenient insertion and branching out of telephony and television signals at selected relay stations along the transmission path. However, due to the repeated demodulation along the transmission path or paths the transmission quality of the microwave communications network as a whole, formed by such radio relay systems, will tend to be degraded. Therefore, as the degradation in the overall transmission quality of the microwave communications network has a particularly pronounced effect on television signals being transmitted, often manifesting itself as substantial waveform distortion, effective measures must be taken to reduce the deleterious effects of this characteristic of the radio relay systems presently in use.

One technique, namely, a heterodyne relay system which has been commonly adopted to deal with the aforementioned problem stems from a realization and determination of the different and specific available functions necessary at the various stations along the transmission path or paths of a radio relay system under consideration. Thus, stations located in large cities must be able to insert and branch out television signals as well as telephony signals; but, since towns of relatively small size rarely serve as an originating source for television signals, stations located in such small towns are required at most to only have the capability of branching out television signals in addition to the capabilities required for insertion and branching out of telephony signals. Accordingly, if baseband terminal stations are considered as those capable of insertion and branching out of both telephony and television signals, and heterodyne-type leak-insertion stations are considered as those capable of only the insertion and branching out of telephony signals and where required the branching out of television signals; it will be seen that large cities must be equipped with baseband terminal stations while towns which are relatively small in size merely require heterodyne-type leak-insertion stations. Thus, the heterodyne technique of designing a radio relay system with baseband terminal stations located in large cities, heterodyne-type leak-insertion stations located in small towns and heterodyne-type repeater stations having no insertion or branching out capabilities located at the requisite intervals therebetween has enabled the development of radio relay systems wherein high quality transmission throughout the long distance microwave communications network formed thereby is maintained.

The microwave communication network formed by such conventional heterodyne radio relay systems generally includes a plurality of distinct radio channels wherein certain of said radio channels are particularly adapted for the transmission of telephony signals and others of said radio channels are adapted for the transmission of television signals. Thus, telephony and television signals are normally transmitted in such radio relay systems along separate radio channels so that the transmission quality of the television signals is maintained and no waveform distortion is induced therein due to the introduction and superposition of telephony signals thereon. The actual number of discrete radio channels present in a microwave communication network formed by such conventional radio relay systems is normally determined by the foreseeable traffic conditions under which the radio relay system is expected to operate. However, in addition to the number of radio channels dictated by foreseeable traffic conditions, a spare channel having a frequency bandwidth capable of transmitting television signals is normally provided for each direction of transmission so that when a possible failure occurs in one of the regular radio channels the signals present therein may be directed to and hence transmitted by said spare channel. Thus, upon the detection of a failure in a radio channel which is in receipt of telephony signals, such telephony signals are applied to the properly directed spare channel of said radio relay system while upon the detection of a failure in a radio channel in receipt of television signals, such television signals are applied to said properly directed spare channel. When the former condition obtains, the insertion and branching out functions of intermediary leak-insertion, stations is maintained by the provision in such leak-insertion stations of switching means which appropriately act to shift the input to the branched out signal terminal from the radio channel in which a failure has occurred to the requisite spare channel and which further acts to switch input telephony signals from the insertion means present at each leak-insertion means from the radio channel in which a failure has occurred to said spare channel. However, when the latter condition is present not only must the television signals applied to the radio channel in which failure has occurred be diverted to said spare radio channel but, in addition thereto, the switching means which controls the application of telephony signals for insertion at leak-insertion stations must be in the correct switching mode so that the telephony signals for insertion are applied to the requisite telephony radio channel and not to said spare radio channel as said spare radio channel, under these conditions, has television signals present therein whose waveform could be severely distorted by the superposition of telephony signals thereon. Thus, the switching means present at each leak-insertion station must at all times act in a positive manner to prevent the inserted telephone signal from impairing the quality of television signals which may be present from time to time in said spare radio channel. Accordingly, it will be appreciated that the switching means present at each leak-insertion station becomes highly complex and in addition thereto, substantial apparatus devoted solely to switching functions must be present at each leak-insertion station present in such conventional radio relay systems. Furthermore, experience with such conventional radio relay systems indicates that the operation of the switching means present at each of the leak-insertion stations is far from ideal, despite the complexity thereof, because such switching means often fail in completely preventing the application of telephony signals for insertion to the spare radio channel when television signals are present therein and hence, deterioration of the television signals present in the spare radio channel often results.

Therefore, it is a principal object of this invention to provide an improved heterodyne radio relay system wherein the switching between radio channels is carried out in a positive heterodyne-type manner so that the transmission quality of the television signals transmitted thereby is maintained.

It is an additional object of this invention to provide an improved radio relay system wherein switching is carried out such that there is no possibility that telephony signals applied to said radio relay system at a leak-insertion station thereof will be superimposed upon television signals being transmitted by said radio relay system.

It is a further object of this invention to provide an improved heterodyne-type radio relay system including at least one spare radio channel wherein if television signals are being transmitted in said spare radio channel due to the detection of a failure in a regular radio channel therefor said radio relay system is incapable of inserting telephony signals introduced at the one or more leak-insertion stations thereof into said spare radio channel whereas if telephony signals are being transmitted in said spare radio channel, additional telephony signals introduced at the one or more leak-insertion stations thereof may be readily inserted into said spare radio channel.

Other objects and advantages of the invention will become clear from the following detailed description of an embodiment thereof, and the novel features will be particularly pointed out in conjunction with the appended claims.

In accordance with this invention, an improved heterodyne-type radio relay system is provided including at least first and second baseband terminal stations and at least one leak-insertion station, a plurality of regular radio channels adapted for the transmission of information signals linking said baseband terminal stations and said at least one leak-insertion station wherein said plurality of regular radio channels includes at least one radio channel for the transmission of television signals in a direction from said first baseband terminal station to said second baseband terminal station and at least one radio channel for the transmission of multiplexed telephony signals in a direction from said first baseband terminal station to said second baseband terminal station, and a spare radio channel being adapted to replace a regular radio channel upon the detection of a failure therein, said at least one leak-insertion station comprising means for branching out information signals addressed thereto in a direction opposite to said transmission direction an means for inserting information signals to be addressed to other stations in said radio relay system, said means for inserting information signals acting to cause the transmission of the information signals to be inserted in a direction opposite to said transmission direction whereby said information to be inserted at said leak-insertion station is never directly introduced into the spare radio channel at said leak-insertion station and hence is incapable of distorting the information signals present therein. The invention will be more clearly understood by reference to the following detailed description of an embodiment thereof in conjunction with the accompanying drawings in which:

Figure 1:
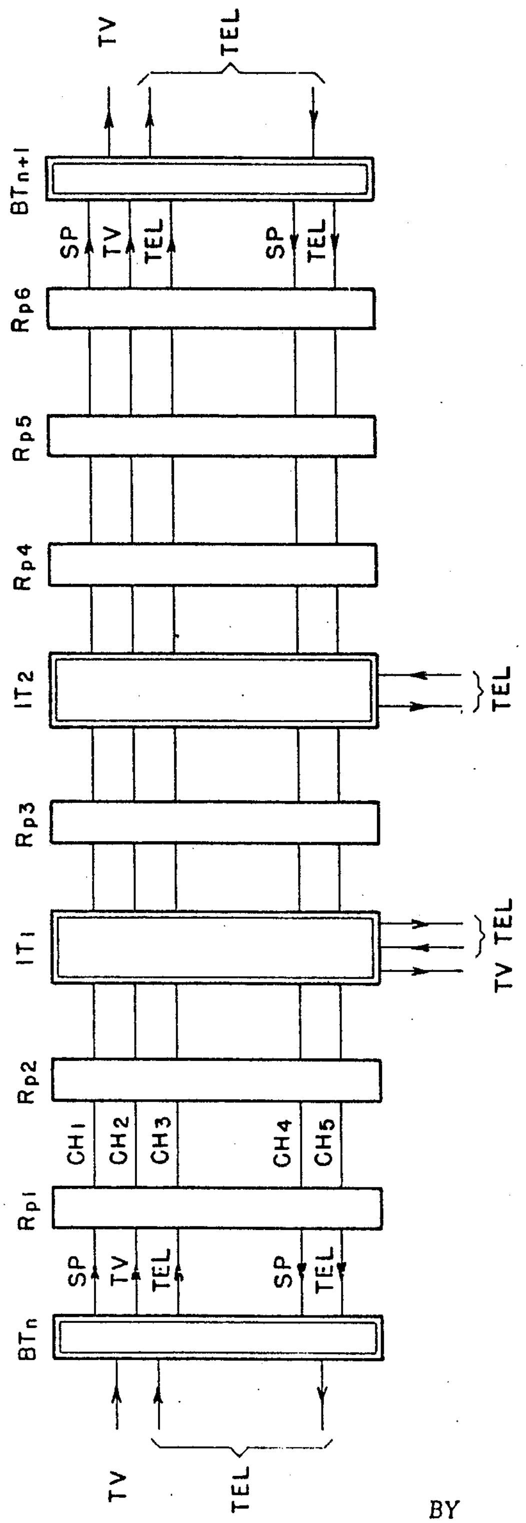
FIG. 1 is a block diagram illustrating a simplified radio relay system according to the present invention.

Referring now to the drawings and more particularly to FIG. 1 thereof, there is shown a schematic representation of a simplified microwave communications network relied upon to describe a radio relay system according to the present invention. Although it will be appreciated by those of ordinary skill in the art that practical microwave communications networks will comprise many more radio channels in each direction than are shown in FIG. 1 as well as a large multiple of the baseband terminal stations and leak-insertion stations shown therein, the simplified microwave communications network illustrated in FIG. 1 is here utilized in conjunction with the disclosure of the present invention because the relative simplicity of the depicted microwave communications network facilitates the explanation of the present invention without the inclusion of the complexities of a more practical microwave communications network. However, despite the simplicity of the microwave communications network relied upon to augment the present disclosure of the instant invention, it will be readily understood by those of ordinary skill in the pertinent art that the inventive concepts disclosed herein readily admit of application to all forms of microwave communications networks because such forms of microwave communications networks merely constitute multiple arrangements of the radio channels, baseband terminal stations and leak insertion stations depicted in FIG. 1. Furthermore, for the purpose of simplifying the disclosure of the present invention, it will be assumed that the number of telephone radio channels consisting of a number of multiplexed telephony signals which originate at a baseband terminal station or a leak-insertion station is one, that a radio channel adapted for the transmission of television signals is provided in only one direction and that only one spare radio channel is provided for transmission in each direction. Thus, the simplified microwave communications network illustrated in FIG. 1 comprises a plurality of baseband terminal stations BT$n$ and BT$n$+1 wherein the suffixes $n$ and $n$+1 imply that further stations in the network may extend from these stations, a plurality of leak-insertion stations IT1 and IT2 and a plurality of regular repeater stations R$p$1—R$Bp$ The precise form which the plurality of baseband terminal stations BT$n$ and BT$n$+1 and the plurality of leak-insertion stations IT1 and IT2 may take will be explained in detail in the description of FIGS. 2 and 3 below, as at this juncture of the specification it is only necessary to appreciate that a plurality of directional radio channels CH1—CH5 are provided among the respective baseband terminal stations BT$n$ and BT$n$+1, the leak-insertion stations $IT_1$ and $IT_2$ and the regular repeater stations R$p$1—R$p$6 in the manner indicated in FIG. 1 by the annotated lines connecting each of the illustrated stations. In FIG. 1, the radio channels CH1—CH5 have been further identified by letter designations wherein SP denotes spare radio channels, TV indicates a radio channel adapted for the transmission of television signals, Tel refers to radio channels adapted for the transmission of telephony signals and the arrows shown indicate the directivity of each of the illustrated radio channels.

The plurality of regular repeater stations R$p$1—R$p$6 may take the form of conventional heterodyne repeater stations which have no insertion or branching out capabilities while the leak-insertion stations $IT_1$ and $IT_2$ have the insertion and branching out capabilities indicated at the lower portion of the station as depicted in FIG. 1. Thus, leak-insertion station $IT_1$ is illustrated as being capable of inserting only telephony signals while both television and telephony signals may be branched out. Similarly, an inspection of FIG. 1 indicates that leak-insertion station IT2 is capable of only the insertion and branching out of telephony signals. In FIG. 1, the insertion and branching out capabilities of leak-insertion stations $IT_1$ and $IT_2$ have been represented in terms of single channels; however, as will be apparent to those of ordinary skill in the art, in practical microwave communications networks, the insertion and branching out capabilities of each of the leak-insertion stations included therein will be determined by actual traffic conditions.

The spare radio channels indicated as SP in FIG. 1 are provided in a manner such that, as shown by the arrows, only one spare radio channel CH1 and CH4 is provided in each direction. The spare radio channels CH1 and CH4 as will be further discussed below are adapted to allow the transmission of either television or telephony signals therein. However, since a television radio channel is only provided in one direction, one spare radio channel, CH4, may be considered as fully reserved for telephony signals while the oppositely directed spare radio channel, CH1, is provided in common to both television and telephony signals in the respective radio channels CH2 and CH3 therefor.

Figure 2:
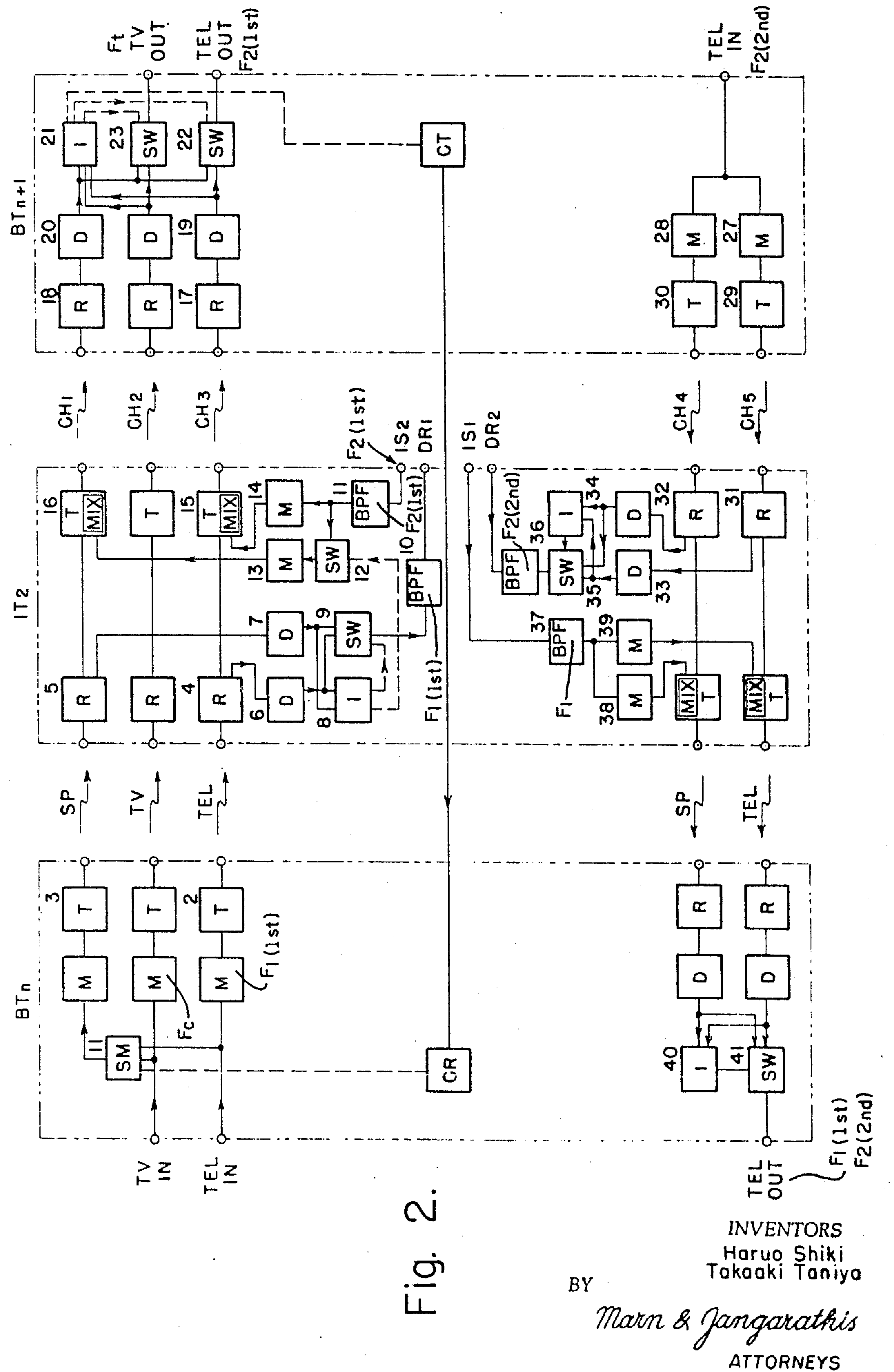
FIG. 2 is a block diagram illustrating the circuit components required in a conventional radio relay system to form the simplified microwave system illustrated in FIG. 1.

FIG. 2 is a block diagram illustrating the structural configuration of a conventional heterodyne radio relay system which may be relied upon to form the simplified microwave communications network illustrated in FIG. 1. More particularly, since the structural configuration of the regular repeater stations R$p$1—R$p$6, which are conventional, are well known and the leak-insertion station IT1 may be similar in form to that of leak-insertion station IT2, wherein only a second branching out network need be added thereto, the conventional radio system depicted in FIG. 2 has been illustrated in detail as to only the baseband stations BT$n$ and BT$n$+1 and the leak-insertion station IT2 while the various radio channels therebetween have been generally indicated. As will be seen hereinafter, the multiplex communications channel connecting the baseband terminal station BT$n$ to the leak-insertion station IT2 is composed of one or more basic signal groups covering, for example, 12 telephone channels. This basic signal group occupies a frequency band F1 and hence the modulating information present in the signals transmitted between the baseband terminal station BT*n* and the leak-insertion station IT2 must be considered as residing within the frequency band $F_1$. Similarly, the multiplex communication channel connecting the baseband terminal station BT*n*+1 to the leak-insertion station IT2 is composed of one or more basic signal groups occupying the frequency band $F_2$. Furthermore, the multiplexed communication channels directly connecting the baseband terminal stations BT*n* and BT*n*+1 in opposite directions without branching out in any leak-insertion station are composed of frequency bands excluding frequency bands excluding bands $F_1$ through $F_4$. Thus, in general, a specific frequency region of the baseband frequency region is assigned to every two adjacent baseband terminal stations and leak-insertion stations; however, as will be apparent to those of ordinary skill in the art, a common frequency region may be assigned to more than two stations so that the so called party line may be formed.

As illustrated in FIG. 2, the conventional radio relay system illustrated therein comprises first and second baseband terminal stations BT*n* and BT*n*+1 and the leak-insertion station IT2 wherein each of said stations is symmetrically arranged for the transmission or receipt of the signals present in the respective radio channels CH1—CH5 thereof. Accordingly, as the three radio channels depicted in the top portion of FIG. 2 and annotated CH1—CH3 have the requisite directivity for information transmission from the baseband terminal station BT*n* to the baseband terminal station BT*n*+1, the baseband terminal station BT*n* comprises input terminal means TV-in and Tel-in, modulator means M for each of channels CH1—CH3, transmitter means T for each of channels CH1—CH3 and switch means $SW_{11}$. The input terminal means TV-in acts as the station input for television signals for application to the television signal radio channel CH2 while the input terminal means Tel-in acts as the input for telephony signals for application to the telephony signal radio channel CH3. The FM modulator means M and the FM transmitter means T are provided for each of the radio channels illustrated in the top portion of FIG. 2 so that discrete radio channels of the previously denominated directivity are provided at the baseband terminal station BT*n*.

The FM modulator means provided for each of the radio channels CH1—CH3 may comprise any of the well-known forms of modulator means which are capable of modulating a carrier wave with television or telephony signals. The FM modulator means M present in each of the radio channels CH1—CH3 are connected at the outputs thereof to the FM transmitter means T while the inputs to the modulator means M present in radio channels CH2 and CH3 are respectively connected to the input terminal means TV-in and Tel-in. The FM transmitter means, which also may take the form of conventional heterodyne devices, act in the well-known manner to transmit the FM modulated information applied thereto to the next station in the radio relay system. The television signal and the telephony signal input means TV-in and Tel-in respectively, present at the baseband terminal station BT*n* are each additionally connected to switch means $SW_{11}$ at the input terminals thereof. The switch means $SW_{11}$ may take the form of conventional baseband switching means which acts in the well-known manner in response to control signals applied thereto to select one of two input signals applied to the input terminals thereof and applies such selected input signals to the output thereof. The output of the switch means $SW_{11}$ is connected to the input to the modulator means M of the spare radio channel CH1 while control signals are applied to the control input of the switch means $SW_{11}$ by the Control Receiver means CR. As shall be seen, hereinafter, the control receiver means CR, which may also be conventional, acts in conjunction with the control signal transmitter CT as a control line such that the network formed by the control receiver CR and the control transmitter CT functions to provide switch means $SW_{11}$ with a control or alarm signal upon the detection of a failure or malfunction in one of the radio channels CH2 or CH3 thereby actuating switch means $SW_{11}$ and causing one of the input signals applied thereto to be connected thereby to the spare radio channel CH1. Thus, depending upon the condition of the switch means $SW_{11}$ telephony signals or television signals from the input terminal means Tel-in or TV-in, respectively, will be applied to the spare radio channel CH1. It should be noted, however, that a priority arrangement is often included within the network formed by the control transmitter CT and the control receiver CR so that when a failure occurs in both the telephony signal radio channel CH3 and the television signal radio channel CH2 the alarm or control signal applied to the switch means $SW_{11}$ will apply telephony signals from the input terminal means Tel-in to the spare radio channel CH1.

The leak-insertion station $IT_2$ is arranged, as may be seen from an inspection of FIG. 2, in a complementary manner to the baseband terminal station BT*n* and hence comprises and is provided with conventional heterodyne receiver means R and conventional heterodyne transmitter means T for each of the radio channels CH1—CH3 directed so as to convey information in a direction from baseband terminal station BT*n* to baseband terminal station BT*n*+1. Therefore, telephony signals present in radio channel CH3 will be received at the leak-insertion station $IT_2$ by receiver means $R_4$ and thereafter be further transmitted in a direction toward baseband terminal station BT*n*+1 by the transmitter means $T_{15}$, television signals propagating in the radio channel CH2 will be received at the leak-insertion station $IT_2$ by the receiver means R therein and thereafter be further transmitted in a direction toward the baseband terminal station BT*n*+1 by the transmitter means T therein and telephony or television signals propagating in the spare radio channel CH1 will be received by the receiver means $R_5$ and be further transmitted in a direction toward the baseband terminal station BT*n*+1 by the transmitter means $T_{16}$. Thus, the leak-insertion station $IT_2$ acts in the same manner as a conventional or regular relay station. However, in addition to its role as a relay station, the leak-insertion station $IT_2$, as previously mentioned, has branching out and insertion capabilities for telephony signals. Accordingly, as telephony signals will reside in the telephony signal radio channel $CH_3$ and may reside in the spare radio channel $CH_1$ the branching out circuitry present in the leak-insertion station $IT_2$ comprises FM detector means $D_6$ and $D_7$, initiator means $I_8$, switch means $SW_9$, band-pass filter means $BPF_{10}$ and telephony signal output terminal means $DR_1$. The FM detector means $D_6$ and $D_7$ are connected to the output of the receiver means $R_4$ and $R_5$ respectively. Each of said FM detector means $D_6$ and $D_7$ may be conventional devices which act in the usual manner to demodulate the modulated information applied thereto by the receiver means $R_4$ and $R_5$. Therefore, as the outputs of the receiver means $R_4$ and $R_5$ will comprise a modulated multiplex signal which occupies the frequency band $F_1$, the output of each of the FM detector means $D_6$ and $D_7$ will comprise a demodulated multiplex signal occupying the frequency band $F_1$. The FM detector means $D_6$ and $D_7$ are each connected at the outputs thereof to both the initiator means $I_8$ and the switch means $SW_9$. The switch means $SW_9$ may be similar to the switch means $SW_{11}$ described above in conjunction with the baseband terminal means BT*n* and accordingly acts to apply one of the input information signals applied thereto by said FM detector means $D_6$ and $D_7$ to the output thereof in response to appropriate input signals applied thereto at the control input thereof. The control input to the switch means $SW_9$ is connected to the output of the initiator means $I_8$ while the output of the switch means $SW_9$ is connected to the input of the band-pass filter means $BPF_{10}$. Thus, it will be seen that upon application of the requisite control signals to the switch means $SW_9$ by the initiator means $I_8$ the output of the FM detector means $D_6$ or $D_7$ will be applied to the band-pass filter means $BPF_{10}$ by the switch means $SW_9$.

The initiator means $I_8$, is a conventional device which acts to discriminate the difference between a television signal and a telephony signal as present at the output of the FM detector means connected thereto by using a pilot signal transmitted together with each informational signal. In addition, the initiator means $I_8$ monitors the signal-to-noise ratio of such pilot signals so that the presence of a failure or malfunction may be detected. Accordingly, as the initiator means $I_8$ is connected to the outputs of both the FM detectors $D_6$ and $D_7$, the resultant monitoring of the output signals therefrom the initiator means $I_8$ results in an output signal which is determinative of which of the outputs of the FM detector means $D_6$ or $D_7$ should be applied by the switch means $SW_9$ to the band-pass filter means $BPF_{10}$. The band-pass filter means $BPF_{10}$ may comprise any of the well-known forms of filter means whose pass band is designed to pass frequencies in the range of $F_1$ which is the frequency range occupied by the multiplex telephony signals transmitted from the baseband terminal station BT$n$ to the leak-insertion station $IT_2$. The band-pass filter means $BPF_{10}$ therefore acts to pass the telephony signals applied thereto, after appropriate filtering, to the output terminal means $DR_1$ connected to the output thereof. Therefore, telephony signals from the requisite radio channel $CH_1$ or $CH_3$, then acting to transmit such telephony signals, are branched out and are available at the output terminal means $DR_1$.

The leak-insertion station $IT_2$ as previously mentioned also functions to allow the insertion of telephony signals thereat. As was described above, the multiplex telephony signals transmitted from the baseband terminal station BT$n$ to the leak-insertion station $IT_2$ comprises a signal group which occupies the frequency band $F_1$; however, the multiplex telephony signals transmitted from the leak-insertion station $IT_2$ to the baseband terminal station BT$n$+1 comprise a signal group which occupies the frequency band $F_2$. Therefore, the leak-insertion station $IT_2$ is provided with telephony signal insertion circuitry which comprises input terminal means $IS_2$, band-pass filter means $BPF_{11}$, switch means $SW_{12}$ and modulator means M13 and M14. The input terminal means $IS_2$ is connected to the input of the band-pass filter means $BPF_{11}$ and is adapted to receive in the well-known manner telephony signals to be inserted in the radio channel then being relied upon for the transmission of telephony signals. The band-pass filter means $BPF_{11}$ may be conventional in form and has a pass band equal to a frequency band of $F_2$. The telephony signals applied to the input terminal means $IS_2$ are thus appropriately filtered by the band-pass filter means $BPF_{11}$ and applied to the FM modulator means M14 and the switch means $SW_{12}$ connected thereto. The switch means $SW_{12}$ may be conventional and may take the form of a switch which acts in response to a control signal applied thereto to close and hence apply the information present at its input terminal to the output terminal thereof. The input terminal of the switch means $SW_{12}$ is connected as shown in FIG. 2 to the output of the band-pass filter means $BPF_{11}$, the control input thereto is connected to the initiator means $I_8$ and the output terminal thereof is connected to the modulator means M13. Therefore, as the initiator means $I_8$ will in theory apply an appropriate control signal to the switch means $SW_{12}$ whenever a failure occurs in the telephony signal radio channel $CH_3$ and an appropriate control signal to open the switch means $SW_{12}$ whenever television signals are being applied to the spare radio channel CH1, the modulator means M13 is supposed to receive input signals only when telephony signals are being transmitted in said spare radio channel $CH_1$. The modulator means M13 and M14 may be conventional modulator means which act in the well-known manner to modulate a carrier frequency with the telephony information applied as an input thereto. The output of the modulator means M13 is connected to a mixing input of the heterodyne transmitter means $T_{16}$ whereat the carrier wave modulated by the telephony signals to be inserted are mixed with the information being transmitted in the spare radio channel $CH_1$ and thereafter is transmitted in the direction of the baseband terminal station BT$n$+1. Similarly, the output of the modulator means M14 is connected to a mixing input of the heterodyne transmitter means $T_{15}$ where the carrier wave modulated by the telephony signals to be inserted are mixed with the telephone signals being transmitted in the telephony signal radio channel CH3 and thereafter transmitted in the direction of the baseband terminal station BT$n$+1. Therefore, it will be seen that the leak-insertion station $IT_2$ is provided with circuitry giving telephony signal branching out and insertion capabilities. Furthermore, although the leak-insertion station $IT_1$ illustrated in FIG. 1 has been omitted in FIG. 2, it will be apparent that the structure of the leak-insertion station $IT_1$ will be the same as that described for the leak-insertion station $IT_2$ except that additional demodulator means, switch means and band-pass filter means will be included therein to provide for the branching out of the television signals capability thereof, indicated in FIG. 1.

The baseband terminal station BT$n$+1 is also arranged, as indicated in FIG. 2, in a complementary manner to the baseband terminal station BT$n$. Accordingly, the baseband terminal station BT$n$+1 comprises conventional heterodyne receiver means R and detector means D for each of the radio channels CH1—CH3 whose transmission is directed for the transmission of information from the baseband terminal station BT$n$ to the baseband terminal station BT$n$+1. 1Therefore, telephony signals present in the radio channel CH3 will be received at the baseband terminal station BT$n$+1 by heterodyne receiver means $R_{17}$ and demodulated by the FM detector means $D_{19}$, television signals propagating in the radio channel CH2 will be received at the heterodyne receiver means R therein and thereafter be demodulated by the detector means D and telephony or television signals propagating in the spare radio channel CH1 will be received by the heterodyne receiver means R15 and be demodulated by the detector means $D_{20}$. In addition, the baseband terminal station BT$n$+1 includes initiator means $I_{21}$ and switch means $SW_{22}$ and $SW_{23}$ associated with the radio channels CH1—CH3. The switch means $SW_{22}$ and $SW_{23}$ are conventional devices which function in a similar manner to the switch means $SW_9$ described above. The switch means $SW_{22}$ is connected at the inputs thereto to the output of the FM detector means $D_{19}$ for the telephony radio channel $CH_3$ and to the output of the FM detector means $D_{20}$ for the spare radio channel $CH_1$. The switch means $SW_{22}$ is connected at the output terminal thereof to the telephony signal output terminal means, Tel-out, while the control input to the switch means $SW_{22}$ is connected to the center output of the initiator means $I_{21}$. Thus, the switch means $SW_{22}$ acting under the control of the initiator means $I_{21}$ applies either the signals present in the spare radio channel CH1 or the signals present in the telephony signal radio channel CH3 to telephony signal output terminal means Tel-out. Similarly, the switch means $SW_{23}$, which may take the identical structural configuration as the switch means $SW_{22}$, is connected at the inputs thereto to the output of the FM detector means D for the television radio channel CH2 and to the output of the FM detector means $D_{20}$ for the spare radio channel CH1. The switch means $SW_{23}$ is also connected at the output terminal thereof to the television signal output terminal means TV-out while the control input of the switch means $SW_{23}$ is connected to the lower output of the initiator means $I_{21}$. Accordingly, the switch means $SW_{23}$ acting under the control of the initiator means $I_{21}$ applies either the signals present in the spare radio channel CH1 or the signals present in the television signal radio channel CH2 to the television signal output terminal means TV-out. The initiator means $I_{21}$ may be similar in format and function to the initiator means $I_8$ described above, but here functions to discriminate and monitor information which may be present in the three separate inputs connected thereto to supply control signals to the two switch means $SW_{22}$ and $SW_{23}$ and in addition thereto to the control transmitter means CT. The initiator means $I_{21}$ is connected at the inputs thereto to the outputs of each of the detector means $D_{20}$ for the spare radio channel CH1, the detector means D for the television signal radio channel CH2 and the detector means $D_{19}$ for the telephony radio channel CH3. Furthermore, two of the outputs of the initiator means $I_{21}$ are respectively connected to the control inputs of the switch means $SW_{22}$ and $SW_{23}$ while the third control output of the initiator means $I_{21}$ controls the control transmitter CT. Thus, the initiator means $I_{21}$ not only controls whether signals present in the radio channel CH1 or CH3 are applied to the telephony signal output terminal means Tel-out and whether signals present in the radio channel CH1 or CH2 are applied to the television output terminal means TV-out but in addition thereto acts through the control network formed by the control transmitter means CT and the control receiver means CR to control the state of the switch means $SW_{11}$ and hence the information applied to the spare radio channel CH1 at the baseband terminal station BT*n*.

In addition, the conventional radio relay system illustrated in FIG. 2 includes a telephony signal radio channel CH5 and a spare radio channel CH4 directed for information transmission from the baseband terminal station BT*n*+1 to the baseband terminal station BT*n*. Furthermore, as no television signal radio channel is present for transmission in this direction, the spare radio channel CH4 may be considered as reserved solely for telephony signals whereby no control network is required to control the type of signals applied to said spare radio channel CH4. Therefore, the baseband terminal station BT*n*+1 is equipped for the transmission of telephony signals in a direction from itself to the baseband terminal station BT*n* with circuitry comprising a telephony signal input terminal means Tel-in, FM modulator means M28 and M27, and heterodyne transmitter means $T_{30}$ and $T_{29}$. The telephony signal input terminal means Tel-in is adapted to receive telephony signals applied at the baseband terminal station BT*n*+1 for transmission toward the baseband terminal station BT*n*. The telephony signal input terminal means Tel-in is connected to each of the FM modulator means M28 and M27 which are operatively connected, as indicated in FIG. 2, to form the initial stages of the respective radio channels CH4 and CH5. The FM modulator means M28 and M27 may be similar to the FM modulator M13 and M14 described above, and, transmission of multiplex telephony signals between the baseband terminal station BT*n* +1 and the leak-insertion station $IT_2$ is performed in the frequency region F2. The telephony signals applied to the telephony input terminal means Tel-in are thus applied to each of the FM modulator means M28 and M27 present in each of the radio channels CH4 and CH5 where such telephony signals are utilized in the well-known manner to modulate a given carrier. The outputs of the FM modulator means M28 and M27 are connected to the heterodyne transmitter means $T_{30}$ and $T_{29}$, respectively, present in the radio channels CH4 and CH5. The heterodyne transmitter means $T_{30}$ and $T_{29}$ may be conventional devices which in the well-known manner act upon the FM modulated information applied thereto to transmit said FM modulated information in the respective radio channel associated therewith toward the baseband terminal station BT*n*. Thus, it will be seen that the telephony signals applied to the telephony signal input terminal means Tel-in at the baseband terminal station BT*n*+1 are applied for transmission in both of the radio channels CH4 and CH5.

The portion of the leak-insertion station $IT_2$ associated with the spare radio channel CH4 and the telephony radio channel CH5, which are each directed for the transmission of telephony signals from the baseband terminal station BT*n*+1 to the baseband terminal station BT*n*, are arranged to complement the transmitting counterpart thereof at the baseband terminal station BT*n*+1. Accordingly, the leak-insertion station $IT_2$ includes heterodyne receiver means R and heterodyne transmitter means T associated with each of the radio channels CH4 and CH5 whereby information being transmitted in each of said radio channels CH4 and CH5 may be received at said leak-insertion station $IT_2$ and thereafter retransmitted using the frequency range $F_1$ in its appropriate channel toward the baseband terminal station BT*n*. In addition thereto, since the leak-insertion station $IT_2$ is to include insertion and branching out capabilities, branching circuitry is provided for branching out telephony signals in the frequency range $F_2$ received at said leak-insertion station $IT_2$ and insertion circuitry is provided so that telephony signals may be inserted at said leak-insertion station $IT_2$ and transmitted therefrom using the frequency range $F_1$. The branching out circuitry for the radio channels CH4 and CH5 provided at the leak-insertion station $IT_2$ comprises FM detector means $D_{33}$ and $D_{32}$, switch means $SW_{35}$, initiator means $I_{34}$ and band-pass filter means $BPF_{36}$. The FM detector means $D_{33}$ and $D_{32}$ are connected to a second output of the receiver means R present in each of the radio channels CH5 and CH4, respectively, so that demodulated telephony signals in the frequency range $F_2$ which may be present in either of said radio channels CH5 and CH4 may be detected and made available at the outputs of said FM detector means $D_{33}$ and $D_{32}$. The outputs of said detector means $D_{33}$ and $D_{32}$ are connected to the respective inputs of both the switch means $SW_{35}$ and the initiator means $I_{34}$. The switch means $SW_{35}$ may be similar to the switch means $SW_9$ described above and accordingly acts to apply one of the FM detector outputs applied thereto to its output terminal in response to appropriate control signals applied thereto by the initiator means $I_{34}$. The initiator means $I_{34}$ may be similar to the initiator means $I_8$ described above but here functions in response to the monitoring of the demodulated telephony signals applied thereto by said detector means $D_{33}$ and $D_{32}$ to supply a single control signal to the switch means $SP_{35}$, which control signal is indicative of the radio channel CH4 or CH5 that is to be utilized for the branching out of telephony signals therefrom. The requisite radio channel CH4 or CH5 indicated by such control signal will of course be the telephony signal radio channel CH5 in the absence of a fault or malfunction therein while the spare radio channel CH4 will be otherwise indicated. The output of the switch means $SW_{35}$ is connected, as indicated in FIG. 2 to the band-pass filter means $BPF_{36}$. The band-pass filter means $BPF_{36}$ may comprise a conventional band-pass filter whose pass band is designed to be coterminous with the frequency range $F_2$. The band-pass filter means $BPF_{36}$ therefore may be similar to the band-pass filter means $BPF_{11}$ described above and appropriately acts to filter the detector output signals applied thereto by said switch means and thereafter apply such appropriately filtered telephony signals to the output terminal means $DR_2$. Therefore, it will be seen that the leak-insertion station $IT_2$ is provided with branching circuitry which selectively associates with the detected telephony signals present in one of said radio channels CH4 and CH5 and presents such detected telephony signals, after the requisite filtering, to the branched out telephony output terminal means $DR_2$.

The insertion circuitry associated with the radio channels CH4 and CH5 at the leak-insertion station $IT_2$ comprises the input terminal means $IS_1$, band-pass filter means $BPF_{37}$, and FM modulator means M38 and M39. The input terminal means $IS_1$ is adapted to receive input telephony signals for insertion at the leak-insertion station $IT_2$ and for further transmission therefrom in the direction of the baseband terminal station BT*n*. The input terminal means $IS_1$, as indicated in FIG. 2, is connected to the band-pass filter means $BPF_{37}$. The band-pass filter means $BPF_{37}$ may be similar to the band-pass filter means $BPF_{10}$ described above and hence is designed to have a pass band equal to the frequency range $F_1$ whereby the telephony signals applied thereto by said input terminal means $IS_1$ are appropriately filtered to insure that they reside within said frequency range $F_1$ prior to their application to the FM modulator means M38 and M39. The output of the band-pass filter means $BPF_{37}$ is connected to the inputs of both the FM modulator means M38 and M39. The FM modulator means M38 and M39 may be similar to the $M_1$ modulator means previously described above and accordingly act to frequency modulate a carrier frequency with the telephony signals applied thereto. As may be seen by an inspection of FIG. 2, the FM modulator means M38 is associated with the spare radio channel CH4 while the FM modulator means M39 is associated with the telephony signal radio channel CH5. Therefore, the FM modulator means M38 is connected at the output thereof to the mixer input of the heterodyne transmitter means T present in the spare radio channel CH4 and the FM modulator means M39 is connected at the output thereof to the mixer input of the heterodyne transmitter means T present in the radio channel CH5. The heterodyne transmitter means T present in each of the radio channels CH4 and CH5 function in a similar manner to the heterodyne transmitter means $T_{15}$ and $T_{16}$ described above, whereby the inserted, modulated telephony signals applied at the input terminal means $IS_1$ are appropriately mixed with telephony signals received from the preceding baseband terminal station BT*n*+1 and the signals thus combined are transmitted by said transmitter means T associated with the respective radio channels CH4 and CH5 in the direction of the baseband terminal station BT*n*. Thus, it will be appreciated that telephony signals inserted at the leak-insertion station $IT_2$ are combined with the telephony signals received thereby in both the spare radio channel CH4 and the telephony signal radio channel CH5 and transmitted toward the baseband terminal station BT*n* using the frequency range $F_1$.

The portion of the baseband terminal station BT*n* associated with the spare radio channel CH4 and the telephony signal radio channel CH5 which transmit signals thereto comprises heterodyne receiver means R and FM detector means D associated with each of the radio channels CH4 and CH5 and additionally includes initiator means $I_{40}$ and switch means $SW_{41}$. The heterodyne receiver means R and the FM detector means D associated with each of the radio channels CH4 and CH5 may be similar to those described above and accordingly modulated telephony signals which may be propagating in the radio channels CH4 and CH5 are received by the respective heterodyne receiver means R present at the baseband terminal station BT*n* and associated with each of said radio channels CH4 and CH5 and thereafter demodulated by the FM detector means D therefor. The outputs of the FM detector means D present in the baseband terminal station BT*n* thus comprise the demodulated telephony signals, residing in the frequency bands F1 an F2 which telephony signals are propagating in each of the radio channels CH4 and CH5, respectively. The output of each of the FM detector means D present in the baseband terminal station BT*n* and associated with the radio channels CH4 and CH5 are each connected to respective inputs of both the initiator means $I_{40}$ and switch means $SW_{41}$. The initiator means $I_{40}$ and the switch means $SW_{41}$ may be similar to the initiator means $I_{34}$ and the switch means $SW_{35}$, respectively, described above and may function in precisely the same manner thereas. Furthermore, as the initiator means $I_{40}$ and the switch means $SW_{41}$ are interconnected in the same manner as the initiator means $I_{34}$ and the switch means $SW_{35}$, it will be seen that said initiator means $I_{40}$ and the switch means $SW_{41}$ function in combination such that telephony signals from the telephony signal radio channel CH5 are present at the output of the switch means $SW_{41}$ when no failure or malfunction has occurred therein and under other conditions, the output of the switch means $SW_{41}$ consists of telephony signals derived from said spare radio channel CH4. Therefore, as the output of said switch means $SW_{41}$ is connected to the telephony output terminal means Tel-out, telephony signals from the requisite radio channel CH4 or CH5 will be applied thereto under the control of the initiator means $I_{40}$.

In the operation of the conventional radio relay system illustrated in FIG. 2, it may be assumed that multiplexed telephony signals and television signals for transmission from the baseband terminal station BT*n* to the baseband terminal station BT*n*+1 are applied to the telephony and television input terminal means Tel-in and TV-in, respectively, of the baseband terminal station BT*n* and that multiplexed telephony signals for transmission from the baseband terminal station BT*n*+1 to the baseband terminal station BT*n* are applied to the input terminal means Tel-in of the baseband terminal station BT*n*+1 If it is further assumed for the moment that the radio relay system and each radio channel therein is operating properly wherein no failure or malfunctions has occurred in a radio channel thereof, the telephony signals applied to the telephony signal input terminal means Tel-in of the baseband terminal station BT*n* will be applied to the FM modulator means $M_1$ associated with the radio channel CH3 which will utilize the multiplexed telephony signals applied thereto to appropriately frequency modulate a carrier wave and the FM telephony signals produced thereby are applied to the heterodyne transmitter means $T_2$ associated with the radio channel CH3. The heterodyne transmitter means $T_2$ then acts to transmit the telephony signals applied thereto toward the baseband terminal station BT*n*+1. As aforesaid, the multiplex communication channel connecting the baseband terminal station BT*n* to the leak-insertion station $IT_2$ is composed of one or more basic signal groups covering, for example, 12 telephone channels wherein said basic signal group occupy the frequency band $F_1$. Therefore, transmission occurs between baseband terminal station BT*n* and the leak-insertion station $IT_2$ using the frequency range $F_1$. The telephony signals transmitted by the heterodyne transmitter means $T_2$ are received at the leak-insertion station $IT_2$ by the heterodyne receiver means $R_4$ present in the portion thereof associated with the telephony signal radio channel CH3. The telephony signals received by the heterodyne receiver means $R_4$ of the leak-insertion station $IT_2$ are applied thereby to both the heterodyne transmitter contradistinction $T_{15}$ present in the radio channel CH3 portion thereof and to the FM detector means $D_6$. As the multiplex communication channel connecting the leak-insertion station $IT_2$ to the baseband terminal station BT*n*+1 is composed of one or more basic signal groups occupying the frequency band F2, the heterodyne transmitter means $T_{15}$ will act in the well-known manner to accomplish the transmission of the multiplexed telephony signals applied thereto, toward the baseband terminal station BT*n*+1 using the frequency range $F_2$.

In contradistinction thereto the telephony signals applied by the heterodyne receive means $R_4$ to the FM detector means $D_6$ are demodulated thereby in the well-known manner such that the multiplex telephony signals are extracted from the modulated carrier signals. The output of the FM detector means $D_6$ is applied as aforesaid to the inputs of both the initiator means $I_8$ and the switch means $SW_9$. Under the initial assumptions postulated above for the explanation of the operation of the conventional radio relay system illustrated in FIG. 2, no failure or malfunction has presently occurred in either of the radio channels CH3 or CH2 and hence the switch means $SW_9$ under the control of the initiator means $I_8$ will function to apply the output of the FM detector means $D_6$ to the output of the switch means $SW_9$. The output of the switch means $SW_9$ is connected to the input of the band-pass filter means $BPF_{10}$ whereby the output of said FM detector means $D_6$ residing within the frequency band $F_1$, the frequency range utilized in the transmission of the multiplexed telephony signals from the baseband terminal station BT*n* to the leak-insertion station $IT_2$, is applied to the telephony signal output terminal means $DR_1$. Thus, it is seen that multiplexed telephony signals being transmitted from the baseband terminal station BT*n* toward the baseband terminal station BT*n*+1 are branched out at the leak-insertion station $IT_2$ and are available at the telephony signal output terminal means $DR_1$.

In addition, multiplex telephony signals to be inserted at the leak-insertion station $IT_2$ for transmission therefrom toward the baseband terminal station BT*n*+1 are applied to the input terminal means $IS_2$. The telephony signals applied to the input terminal means $IS_2$ are coupled to the band-pass filter means $BPF_{11}$ connected thereto so that such telephony signals are appropriately limited to a band which is coterminous with the frequency range $F_2$. The output of the band-pass filter means $BPF_{11}$ is connected to both the switch means $SW_{12}$ which is controlled by the initiator means $I_8$ and to the FM modulator means M14. However, under the initial conditions stated above, as no malfunction or failure has occurred in the radio channels CH2 or CH3, the switch means $SW_{12}$ is in an open condition whereby the output of the band-pass filter means $BPF_{11}$ is only applied to the FM modulator means M14 and is not applied, at least in theory, to the FM modulator means M13. The FM modulator means M14 utilizes the telephony signals applied thereto by said band-pass filter means $BPF_{11}$ to frequency modulate a carrier wave. The output of the FM modulator means M14 is coupled to the mixer input of the heterodyne transmitter means $T_{15}$ which, as previously mentioned, acts to combine the telephony signals applied at the mixer input thereof with the telephony signals applied thereto by the heterodyne receiver means $R_4$. The heterodyne transmitter means $T_{15}$ thereafter appropriately transmits the combined telephony signals received thereby toward the baseband terminal station BT$n$+1 along the propagation path of the telephony signal radio channel CH3. Thus, the telephony signals transmitted by the heterodyne transmitter means $T_{15}$ includes both the telephony signals of radio channel CH3 transmitted from the baseband terminal station BT$n$ toward the baseband terminal station BT $n$+1 and the telephony signals inserted at the leak-insertion station $IT_2$.

The telephony signals transmitted by the heterodyne transmitter means $T_{15}$ will be received at the baseband terminal station BT$n$+1 by the heterodyne receiver means $R_{17}$ therein which is associated with the telephony signal radio channel CH3. The output of the heterodyne receiver means $R_{17}$ is coupled to the FM detector means $D_{19}$ whereby the telephony signals received by said heterodyne receiver means $R_{17}$ are demodulated by said FM detector means so that multiplexed telephony signals are obtained at the output of said FM detector means $D_{19}$. The output of the FM detector means $D_{19}$ is coupled to a first input of the switch means $SW_{22}$ and is also coupled to the lower input of the initiator means $I_{21}$. Since, under the initial conditions stated above, no failure or malfunction has occurred in either of the radio channels CH2 or CH3, the switch means $SW_{22}$ acting under the control of the initiator means $I_{21}$ will apply the output of the FM detector means $D_{19}$ to the telephony signal output terminal means Tel-out connected thereto. Accordingly, it will be seen that telephony signals being transmitted from the baseband terminal station BT$n$ toward the baseband terminal station BT$n$+1 may be branched out at the leak-insertion station $IT_2$, additional telephony signals maybe inserted therein at the leak-insertion station $IT_2$, and such telephony signals will be received at the telephony signal output terminal means Tel-out of the baseband terminal station BT$n$+1.

In a similar manner, television signals applied to the television input terminal means Tel-in of the baseband terminal station BT$n$ for transmission in a direction from said baseband terminal station BT$n$ to the baseband terminal station BT$n$+1 are coupled to the FM modulator means M present in the radio channel portion of said baseband terminal station BT$n$. The frequency modulated output of the FM detector means M associated with the radio channel CH2 in the baseband terminal station BT$n$ is coupled to the heterodyne transmitter means T thereof whereby such frequency modulated television signals are transmitted in a direction from said baseband terminal station BT$n$ toward the baseband terminal station BT$n$+1. The television signals thus transmitted by the heterodyne transmitter means T associated with the radio channel CH2 in the baseband terminal station BT$n$ are received at the leak-insertion station $IT_2$ by the heterodyne receiver means R associated with the radio channel $CH_2$ therein. As the leak-insertion station $IT_2$ has no provision for either the branching out or the insertion of television signals therein, the output of the heterodyne receiver means R associated with the radio channel CH2 may be considered as being applied directly to the heterodyne transmitter means T included in the radio channel CH2 portion of the leak-insertion station $IT_2$. The heterodyne transmitter means T associated with the radio channel CH2 of the leak-insertion station $IT_2$ acts in the well-known manner to transmit the television signals applied thereto in a direction from the baseband terminal station BT$n$ toward the baseband terminal station BT$n$+1. The television signals transmitted by the heterodyne transmitter means T associated with the radio channel CH2 in the leak-insertion station $IT_2$ are received at the baseband terminal station BT$n$+1 by the heterodyne receiver means R present therein as a part of the radio channel CH2. The output of the heterodyne receiver means R present in the baseband terminal station BT$n$+1 as a portion of the radio channel CH2 is applied to the FM detector means D therein so that the frequency modulated television signals received thereby may be appropriately demodulated so that the television signals derived therefrom are available at the output of said FM demodulator means D. The output of the FM demodulator means D associated with the radio channel CH2 portion of the baseband terminal station BT$n$+1 is coupled to both the center input of the initiator means $I_{21}$ therein and an input to the switch means $SW_{23}$. However, under the initial conditions stated above, when no failure or malfunction has occurred in the radio channels CH3 or CH2, the switch means $SW_{23}$ acting under the control of the initiator means $I_{21}$ will apply the demodulated television signals present in the output of said FM detector means D to the television output terminal means TV-out. Thus it will be seen that under the initial conditions stated above, television signals introduced at the television input terminal means TV-in of the baseband terminal station BT$n$ are available at the television signal output terminal means of the baseband terminal station BT$n$+1; however, no branching out or insertion capabilities are here provided for such television signals at the leak-insertion station $IT_2$. Furthermore, under the initial conditions stated, wherein both radio channels CH2 and CH3 are operating properly, the spare radio channel CH1 would be available for the transmission of additional multiplexed telephony signals therein, which additional multiplexed telephony signals could be inserted at the leak-insertion station $IT_2$ by the independent control of the switch means $SW_{12}$.

In a similar manner to the above, when multiplexed telephony signals are applied to the telephony signals input terminal means Tel-in of the baseband terminal station BT$n$+1 for transmission in a direction from the baseband terminal station BT$n$+1 toward the baseband terminal station BT$n$, such telephony signals will be coupled to both the FM modulator means M28 of the spare radio channel CH4 directed for transmission in this direction and to the FM modulator means M27 of the telephony radio channel CH5 directed for the transmission of information from the baseband terminal station BT$n$+1 to the baseband terminal station BT$n$. The FM modulator means M28 and M27 act in the manner described above to utilize the telephony information applied thereto to frequency modulate a given carrier and the output of each of said FM modulator means containing such modulated carrier is coupled to the heterodyne transmitter means $T_{30}$ and $T_{29}$ associated with a respective one of said FM modulator means M28 and M27 in one of the radio channels CH4 or CH5. The heterodyne transmitter means $T_{30}$ and $T_{29}$ associated with the radio channel CH4 and the telephony signal radio channel CH5, respectively, act in a similar manner to the heterodyne transmitter means described to transmit the telephony signals applied thereto in the direction of the baseband terminal station BT$n$. As was previously mentioned, the transmission of multiplexed telephony signals from the baseband terminal station BT$n$+1 to the leak-insertion station $IT_2$ is performed by the utilization of the frequency range $F_2$.

The telephony signals transmitted by the heterodyne transmitter means $T_{30}$ and $T_{29}$, are received at the leak-insertion station $IT_2$ by the heterodyne receiver means R and $R_{31}$, respectively, associated with the radio channels CH4 and CH5. The received telephony signals present at the outputs of the heterodyne receiver means R and $R_{31}$ are applied respectively to the heterodyne transmitter means T present in the respective radio channels CH4 and CH5 as present in the leak-insertion station $IT_2$. In addition, the received telephony signals present at the outputs of the heterodyne receiver means R and $R_{31}$ are applied from the second outputs thereof to the FM detector means $D_{32}$ and $D_{33}$, respectively. The FM detector means $D_{32}$ and $D_{33}$ act in a similar manner to the FM detector means described above so that the modulated telephony signals applied thereto are demodulated therein whereby the telephony signals derived therefrom are available at the outputs of each of the FM detector means $D_{32}$ and $D_{33}$. The outputs of the FM detector means $D_{32}$ and $D_{33}$ are each applied to the inputs of both the switch means $SW_{35}$ and the initiator means $I_{34}$. However, as under the initial conditions stated above, no failure or malfunction has occurred in the telephony signal radio channel CH5, the switch means $SW_{35}$ acting under the control of the initiator means $I_{34}$ will apply only the output of the FM detector means $D_{33}$ to the band-pass filter means $BPF_{36}$ connected to the output thereof. The band-pass filter means $BPF_{36}$ acts in a similar manner to the band-pass filter means $BPF_{11}$ described above and accordingly functions to pass only the portion of the FM detector signal applied thereto which resides within the pass band $F_2$ thereof. Therefore, as the portion of the output of the FM detector signal which resides within the frequency range $F_2$ contains the multiplexed telephony signals originally applied to the telephony signal input terminal means Tel-in located at the baseband terminal station BT*n*+1, it will be seen that such multiplexed telephony signals are available at the telephony output terminal means $DR_2$ which is connected to the output of the band-pass filter means $BPF_{36}$. Thus, telephony signals transmitted from the baseband terminal station BT*n*+1 toward the baseband terminal station BT*n* may be branched out at the leak-insertion station $IT_2$ and such branched out telephony signals are available at the telephony output terminal means $DR_2$ thereat.

Furthermore, as the leak-insertion station $IT_2$ also has the capability for the insertion of telephony signals to be transmitted in a direction from the baseband terminal station BT*n*+1 toward the baseband terminal station BT*n*, multiplexed telephony signals for insertion at the leak-insertion station $IT_2$ will be periodically applied to the telephony insertion terminal means $IS_1$. Since the transmission of multiplexed telephony signals from the leak-insertion station $IT_2$ to the baseband terminal station BT*n* is performed using the frequency range $F_1$, the telephony signals applied for insertion at the telephony signal input terminal means $IS_1$ of the leak-insertion station $IT_2$ should reside within the frequency range $F_1$. The telephony signals applied for insertion of the telephony signal input terminal means $IS_1$ are coupled to the input of the band-pass filter means $BPF_{37}$ where such signals are properly restricted to the frequency range $F_1$. The output of the band-pass filter means $BPF_{37}$ is applied to the inputs of each of the FM modulator means M38 and M39 which act in a similar manner to the FM modulator means described above. The output of the FM modulator means M38 is coupled to the mixer input of the heterodyne transmitter means T for the spare radio channel CH4 while the output of the FM modulator means M39 is applied to the mixer input of the heterodyne transmitter means T associated with the telephony signal radio channel CH5. The heterodyne transmitter means T associated with each of the radio channels CH4 and CH5 at the leak-insertion station $IT_2$ acts in the same manner as the heterodyne transmitter means $T_{15}$ described above. Accordingly, the heterodyne transmitter means T associated with each of the radio channels CH4 and CH5 at the leak-insertion station $IT_2$ act to combine the modulated telephony signals applied to the mixer input thereof with the telephony signals applied thereto by the heterodyne receiver means R present in its associated radio channel CH4 and CH5 and thereafter serve to transmit such combined telephony signals in the direction of the baseband terminal station BT*n*. Thus it will be appreciated that telephony signals for transmission in a direction from the baseband terminal station BT*n*+1 to the baseband terminal station BT*n* may be inserted at the telephony signal input terminal means $IS_1$ of the leak-insertion station $IT_2$.

The telephony signals transmitted by the heterodyne transmitter means T associated in the leak-insertion station $IT_2$ with each of the radio channels CH4 and CH5 are received and demodulated at the baseband terminal station BT*n* by the heterodyne receiver means R and the FM detector means D forming the spare radio channel CH4 and the telephony signal radio channel CH5, respectively, thereof. The outputs of the FM detector means D associated with each of the radio channels CH4 and CH5 in the baseband terminal station BT*n* are each applied to both the initiator means $I_{40}$ and the switch means $SW_{41}$ at respective inputs thereof. Therefore, under the initial conditions stated above, as no fault or malfunction has occurred in the telephony signal radio channel CH5, the switch means $SW_{41}$, acting under the control of the initiator means $I_{40}$, will apply the output of the FM detector means D associated with the radio channel CH5 to the telephony output terminal means Tel-out connected thereto. Therefore, it will be seen that telephony signals being transmitted in a direction from the baseband terminal station BT*n*+1 toward the baseband terminal station BT*n* may be branched out at the leak-insertion station $IT_2$ and that additional telephony signals may be inserted there into at said leak-insertion station $IT_2$.

If it is now assumed that a failure or malfunction occurs in only the telephony radio channel CH5 utilized for the transmission of telephony signals from the baseband terminal station BT*n*+1 toward the baseband terminal station BT*n* while the remainder of the radio channels CH1—CH4 remain normal, this failure will be detected by the initiator means $I_{34}$ located at the leak-insertion station $IT_2$ and connected to the output of each of the FM detector means $D_{33}$ and $D_{32}$ present therein due to the monitoring role thereof. Similarly this failure would also be detected by the initiator means $I_{40}$ located at the baseband terminal station BT*n* which is connected to the outputs of each of the FM detector means D associated with the radio channels CH4 and CH5 at the baseband terminal station BT*n*. In response to the detection of a failure in the radio channel CH5, the initiator means $I_{34}$ will supply a control signal to the switch means $SW_{35}$ whereby said switch means $SW_{35}$ will connect the output of the FM detector means $D_{32}$ to the band-pass filter means $BPF_{36}$ and disconnect the output of the FM detector means $D_{33}$ therefrom. In a like manner, the initiator means $I_{40}$ will act in response to a detection of a failure in the radio channel CH5 to supply a control signal to the switch means $SW_{41}$ so that the output of the FM detector means D associated in the baseband terminal station bt*n* with spare radio channel CH4 will be applied therethrough to the telephony signal output terminal means Tel-out while the output of the FM detector means D for the radio channel CH5 is disconnected therefrom. Therefore, under these conditions the multiplex telephony signals introduced into said spare radio channel CH4 at the telephony signal input terminal means Tel-in at the baseband terminal station BT*n*+1 are applied to the telephony signal output terminal means Tel-out at the baseband terminal station BT*n* such that the telephony signal radio channel CH5 in which a failure or malfunction has occurred is entirely bypassed. Furthermore, the multiplexed telephony signals branched out of the main transmission path at the telephony signal output terminal means $DR_2$ located at the leak-insertion station $IT_2$ are derived, under these conditions, from the output of the FM detector means $D_{32}$ and hence the spare radio channel CH4 so that the radio channel CH5 in which a failure or malfunction has occurred is again completely eliminated.

If it is now assumed that a failure of malfunction has occurred in the telephony signal radio channel CH3, relied upon for the transmission of multiplexed telephony signals in the direction from the baseband terminal station BT*n* toward the baseband terminal station BT*n*+1 while the remainder of the radio channels CH1, CH2, CH4 and CH5 are normal, this failure will be detected by the monitoring of the output of the FM detector means $D_{19}$ by the initiator means $I_{21}$ located at the baseband terminal station BT*n*+1. In response to the detected condition of the telephony signal radio channel CH3, the initiator means $I_{21}$ will supply first and second control signals to the control transmitter means CT and the switch means $SW_{22}$, respectively. The control transmitter means CT in response to the first control signal applied thereto by said initiator means $I_{21}$ will act to transmit a first alarm signal to the control receiver CR. The control receiver means CR acts in the well-known manner to receive such first alarm signal and couples the same to the control input of the switch means $SW_{11}$. The switch means $SW_{11}$ in response to the first alarm signal applied thereto by said control receiver means CR acts to apply the telephony signals applied at the telephony signal input terminal means Tel-in of the baseband terminal station BT*n*, which connects to a first input thereof, to the FM modulator means M associated thereat with said spare radio channel CH1 in the requisite direction. Thus, under these conditions, the multiplexed telephony signals applied to the telephony signal input terminal means Tel-in will be transmitted in the spare radio channel CH1 as well as the radio channel CH3.

The second control signal applied by the initiator means $I_{21}$ to the switch means $SW_{22}$ causes said switch means $SW_{22}$ to apply the output of the FM detector means $D_{20}$, connected thereto at one input thereof, to the telephony signal output terminal means Tel-out and to disconnected the output of the FM detector means $D_{19}$, connected thereto at another input thereof, from said telephony signal output terminal means Tel-out. Thus, under these conditions multiplexed telephony signals introduced at the telephony signal input terminal means Tel-in for transmission in the direction from the baseband terminal station BT*n*, containing said input terminal means Tel-in, toward the baseband terminal station BT*n*+1 are transmitted in the spare radio channel CH1 as well as the radio channel CH3 and such telephony signals from said spare radio channel CH1, when received at said baseband terminal station BT*n*+1. the FM detector means $D_{20}$ and the switch means $SW_{22}$ to the telephony signal output terminal means Tel-out thereat such that said spare radio channel CH1 is relied upon for the requisite transmission rather than the radio relay channel CH3 in which a malfunction has occurred. In addition, as the leak-insertion station $IT_2$ is capable of branching out or inserting multiplex telephony signals for transmission in a direction from the baseband terminal station BT*n* toward the baseband terminal station BT*n*+1, the postulated failure or malfunction in the telephony signal radio channel CH3 will also be detected at the initiator means $I_8$ located at the leak-insertion station $IT_2$ which monitors and discriminates the outputs of the FM detector means $D_6$ and $D_7$ for the radio channels CH3 and CH1, respectively. In response to the detection of a failure or a malfunction in the telephony signal radio channel CH3 by the monitoring of the outputs of the FM detector means $D_6$ and $D_7$, the initiator means $I_8$ supplies control signals to the control inputs of the switch means $SW_9$ and $SW_{12}$. Upon the receipt of such control signals, the switch means $SW_9$ will disconnected the output of the FM detector means $D_6$ from the input to the band-pass filter means $BPF_{10}$ and connect the output of the FM detector means $D_7$ thereto. Similarly, in response to the control signals applied thereto, the switch means $SW_{12}$ will apply the output of the band-pass filter means BPF11 to the FM modulator means M13 such that telephony signals for insertion are applied to the heterodyne transmitter means $T_{16}$ as well as the heterodyne transmitter means $T_{15}$. Thus, under these conditions it will be seen that the spare radio channel CH1 is relied upon for the transmission of multiplexed telephony signals from the baseband terminal station BT*n* toward the baseband terminal station BT*n*+1, multiplexed telephony signals are branched out of said spare channel CH1 at the leak-insertion station $IT_2$ and are available at the telephony signal output terminal means $DR_1$ and multiplexed telephony signals are inserted in the spare radio channel CH1 by the electrical path formed by said telephony signal input terminal means $IS_2$, the band-pass filter means $BPF_{11}$, the switch means $SW_{12}$, the FM modulator means M13 and the heterodyne transmitter means $T_{16}$.

Similarly, if it is assumed that a failure or malfunction has occurred in the television signal radio channel CH2, relied upon the transmission of television signals in the direction from the baseband terminal station BT*n* toward the baseband terminal station BT*n*+1 while the remaining radio channels CH1 and CH3—CH5 are in a normal operating condition, this failure will be detected by the monitoring of the output of the FM detector means D, as present in the baseband terminal station BT*n*+1, by the initiator means $I_{21}$. In response to the detected condition of the television signal radio channel CH2, the initiator means $I_{21}$ will apply third and fourth control signals to the control transmitter means CT and the switch means $SW_{23}$, respectively. In response to the third control signal applied from the initiator means $I_{21}$, the control transmitter means CT acts to transmit a second alarm signal to the control receiver means CR. The control receiver means CR in response to said second alarm signal acts to apply said second alarm signal to the control input of the switch means $SW_{11}$. The switch means $SW_{11}$ in response to the second alarm signal applied thereto by said control receiver means CR acts to couple the television signals applied at the television signal input means TV-in of the baseband terminal station BT*n*, connected to a second input thereto, to the FM modulator means M associated in said baseband terminal station BT*n* with the spare radio channel CH1. Accordingly, when these conditions obtain, the television signals applied to the television signal input terminal means TV-in will be transmitted in the spare radio channel CH1 in addition to the radio channel CH2. The fourth control signal applied by the initiator means $I_{21}$ to the switch means $SW_{23}$ causes said switch means $SW_{23}$ to apply the output of the FM detector means $D_{20}$, connected at one input thereof, to the television signal output terminal means TV-out and to disconnect the output of the FM detector means D, connected at a second input thereof, from said television signal output terminal means TV-out. Therefore, under these conditions television signals introduced at the television input terminal means TV-in of said baseband terminal station BT n are transmitted in the spare radio channel CH1 in addition to the television signal radio channel CH2 and such television signals in said spare radio channel CH1, when received at said baseband terminal station BT*n*+1, are applied through the heterodyne receiver means $R_{15}$ the FM detector means $D_{20}$ and the switch means $SW_{23}$ to the television signal output terminal means TV-out thereat such that said spare radio channel CH1 is relied upon for the requisite transmission rather than the radio relay channel CH2 in which a failure has occurred.

When the failure is detected in the television radio channel CH2 by the initiator means $I_{21}$ and the television signals applied to the television signal input terminal means TV-in are caused to be transmitted over the spare radio channel CH1, the condition wherein television signals are present in the spare radio channel CH1 and telephony signals are present in the radio channel CH3 is detected by the initiator means $I_8$ which discriminates the pilot signal transmitted with each of said telephony and television signals by the application of the outputs of each of the FM detector means 6 and 7 thereto. Upon the detection of the presence of television signals in the spare radio channel CH1, the initiator means $I_8$ will apply a control signal to the switch means $SW_{12}$ to place said switch means $SW_{12}$ in an open condition whereby telephony signals applied at the telephony signal input terminal means $IS_2$ are not applied to the FM modulator means M13 and hence to the spare radio channel CH1 via the mixer input of the heterodyne transmitter means $T_{16}$. As will be appreciated by those of ordinary skill in the art, the appropriate condition of the switch means $SW_{12}$ is of paramount importance because if said switch means $SW_{12}$ should be closed when television signals are being transmitted in said spare radio channel CH1, such television signals will be substantially degraded in quality and distorted by the telephony signals superimposed thereon. However, in conventional radio relay systems similar to that illustrated in FIG. 2, the improper or erroneous operation of switch means $SW_{12}$ will often result such that telephony signals are inserted in the spare radio channel CH1 when television signals are being transmitted therein whereby the resultant television signal transmission is substantially impaired. Accordingly, it will be manifest, that the conventional radio relay systems as illustrated in FIG. 2 are highly complex and their mode of operation continually subjects the television signals transmitted therein in the spare radio channel thereof to potential distortion and the attendant quality degradation.

In the radio relay system according to the present invention, the possibility that telephony signals inserted at a leak-insertion station can be superimposed upon the television signals being transmitted in a spare radio channel has been completely eliminated while the basic structural configuration of the radio relay system has been substantially simplified.

Figure 3:
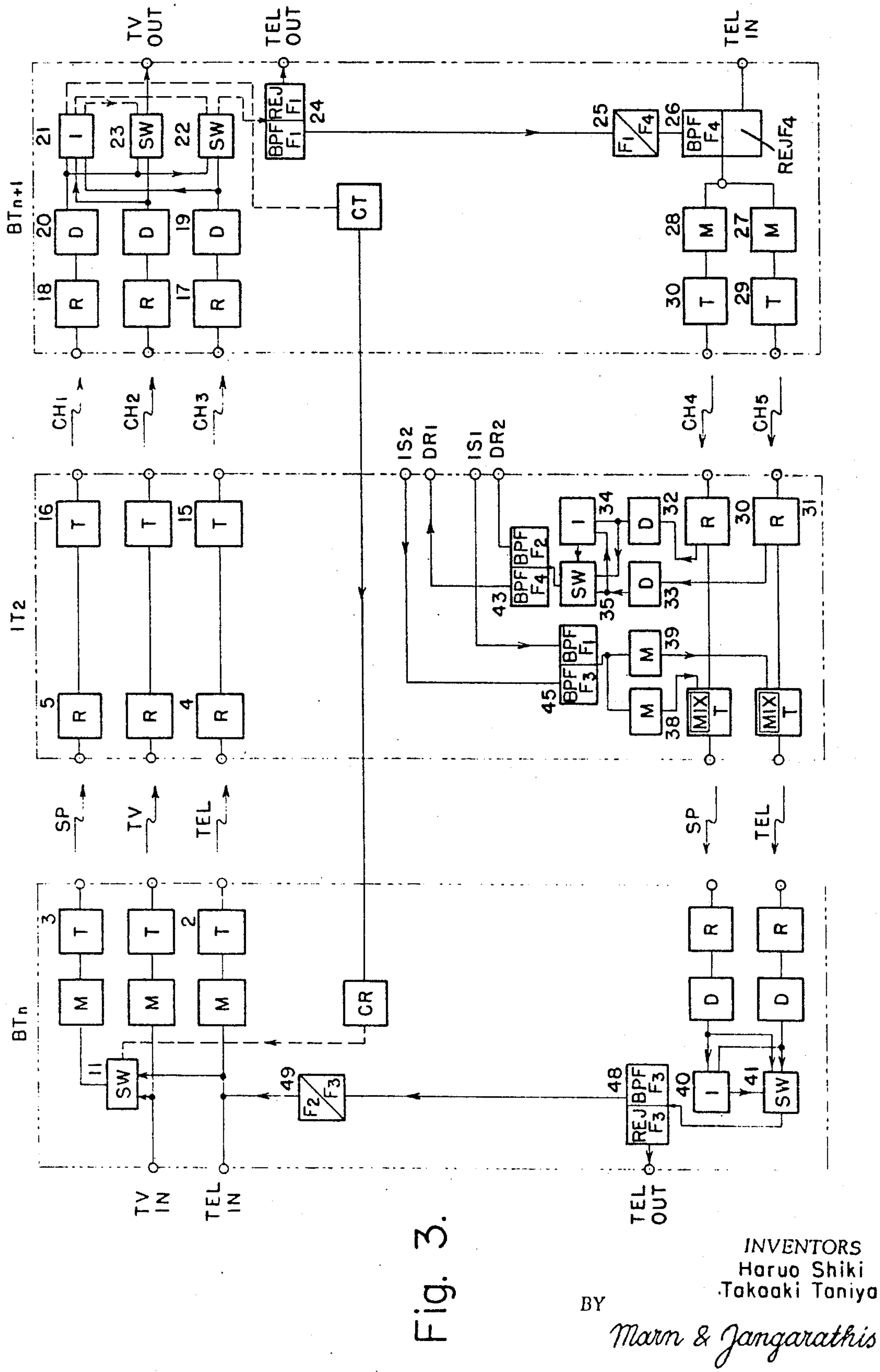
FIG. 3 is a block diagram illustrating an exemplary embodiment of a radio relay system according to the present invention as embodied in FIG. 1.

Referring now to FIG. 3, there is shown a block diagram illustrating an exemplary embodiment of a radio relay system in accordance with the teachings of the present invention. As was the case in the conventional radio relay system illustrated in FIG. 2, the highly simplified microwaves communications network illustrated in FIG. 1 will be formed by the exemplary embodiment of the present invention illustrated in FIG. 3 and only the baseband terminal stations BT*n* and BT*n*+1 and the leak-insertion station $IT_2$ are specifically shown therein in order to retain the simplicity of the instant disclosure. Furthermore, as the embodiment of this invention illustrated in FIG. 3 includes a plurality of elements which were relied upon and previously described in conjunction with the FIG. 2 radio relay system; where applicable, elements common to both FIG. 2 and FIG. 3 have retained previously relied upon designations in FIG. 3 and such common elements, in the description of the embodiment of this invention illustrated in FIG. 3 which follows, will merely be identified as to their nature while the explanation of their character and function will be made by reference to the previous explanation given thereof in conjunction with FIG. 2.

As illustrated in FIG. 3, the embodiment of the radio relay system according to the present invention comprises first and second baseband terminal stations BT*n* and BT*n*+1 and the leak-insertion station $IT_2$ wherein each of the foregoing stations are symmetrically arranged for the transmission or receipt of the signals present in the respective radio channels CH1—CH5 of the illustrated radio relay system. The top three radio channels CH1—CH3 illustrated in FIG. 3 have the requisite directivity for information transmission from the baseband terminal station BT*n* toward the baseband terminal station BT*n*+1. The portion of the baseband terminal station BT*n* associated with the radio channel CH1—CH3 comprises input terminal means TV-in and Tel-in, modulator means M for each of said radio channels CH1—CH3, heterodyne transmitter means T for each of said radio channels CHI—CH3, switch means $SW_{11}$, and control receiver means CR. Each of the foregoing elements as present in the baseband terminal station BT*n* and associated with the radio channels CH1—CH3 therein was present in the baseband terminal station BT*n* of the radio relay system previously described in conjunction with FIG. 2 and accordingly as each of said elements perform substantially the same function as their FIG. 2 counterparts and additionally are interconnected in the same manner as in FIG. 2, the function and connections associated with each of said elements may be adequately appreciated from their discussion above anent FIG. 2. Thus, the portion of the baseband terminal station BT*n* associated with the spare radio channel CH1, television signal radio channel CH2 and the telephony signal radio channel CH3 may be considered to be substantially the same as that associated with the conventional radio relay system illustrated in FIG. 2.

The leak-insertion station $IT_2$, as may be seen from an inspection of FIG. 3, is arranged in a complementary manner to the baseband terminal station BT*n* and hence includes heterodyne receiver means R and heterodyne transmitter means for each of the radio channels CH1—CH3 directed for information transmission in a direction from the baseband terminal station BT*n* toward the baseband terminal station BT*n*+1. Therefore, this portion of the leak-insertion station $IT_2$ acts in a similar manner to the corresponding portions of the conventional radio relay system illustrated in FIG. 2 such that telephony signals present in radio channel CH3 will be received at the leak-insertion station $IT_2$ by heterodyne receiver means $R_4$ and thereafter be further transmitted in a direction toward the baseband terminal station BT*n*+1 by the heterodyne transmitter means $T_{15}$, television signals propagating in the radio channel CH2 will be received at the leak-insertion station $IT_2$ by heterodyne receiver means R therein and thereafter be further transmitted in a direction toward the baseband terminal station BT*n*+1 by the heterodyne transmitter T therein and telephony or television signals present in the spare radio channel CH1 will be received by the receiver means $R_5$ and be further transmitted in a direction toward the baseband terminal station BT*n*+1 by the heterodyne transmitter means $T_{16}$. Thus, although corresponding portions of the leak-insertion stations $IT_2$ present in FIGS. 2 and 3 include similar apparatus, the leak-insertion station $IT_2$ present in FIG. 3 does not contain the branching out or insertion expedients relied upon in the leak-insertion station $IT_2$ of FIG. 2 to perform the branching out or insertion of multiplexed telephony signals in the radio channels CH1 and CH3. Furthermore, as shall be seen hereinbelow, as the functions of branching out and insertion of telephony signals in the radio channels CH1 and CH3 are retained at the leak-insertion station $IT_2$ of the embodiment of this invention illustrated in FIG. 3, a substantial reduction in the apparatus required in the instant embodiment of the present invention is accomplished in the radio relay system illustrated in FIG. 3, when compared to the conventional radio relay system illustrated in FIG. 2.

The baseband terminal station BT*n*+1 is also arranged, as illustrated in FIG. 3, in a complementary manner to the baseband terminal station BT*n* and the transmitting portion of the leak-insertion station $IT_2$. Accordingly, the baseband terminal station BT*n*+1 comprises conventional heterodyne receiver means R and detector means D for each of the radio channels CH1—CH3 which are directed for the transmission of information from the baseband terminal station BT*n* toward the baseband terminal station BT*n*+1. These conventional heterodyne receiver means R and detector means D are each connected in the same manner and perform the same functions as their FIG. 2 counterparts so that telephony signals present in the radio channel CH3 will be received at the baseband terminal station BT*n*+1 by the heterodyne receiver means $R_{17}$ and demodulated by the FM detector means $D_{19}$, television signals propagating in the radio channel CH2 will be received at the heterodyne receiver means R therein and demodulated by the detector means D and telephone or television signals propagating in the space radio channel CH1 will be received by the heterodyne receiver means $R_{18}$ and demodulated by the detector means $D_{20}$. In addition, in a similar manner to the conventional radio relay system illustrated in FIG. 2, the baseband terminal station BT*n*+1 of the embodiment of the instant invention illustrated in FIG. 3 also includes initiator means $I_{21}$, the switch means $SW_{22}$ and $SW_{23}$, the television output terminal means TV-out and the control transmitter means CT are each connected in the same manner and perform the same function as the correspondingly designated elements in FIG. 2, reference may be had to the description of FIG. 2 above to ascertain the function and mode of operation of each of such commonly utilized elements.

As is shown in FIG. 3, the output of the switch means $SW_{22}$ is connected to the branching or separation filer means 24. The branching or separation filter means 24 may be conventional and acts in the well-known manner to pass to a first output thereof a preselected frequency bandwidth of an input signal applied thereto while rejecting the remaining portions of the frequency spectrum of the input signal applied thereto and applying said rejected portion to a second output thereof. As indicated in FIG. 3, the pass band of the separation filter means has been designated at $F_1$ while all other frequencies residing outside the notch band $F_1$ are rejected. The rejected frequency output of the separation filter means 24 is connected to the telephony signal output terminal means Tel-out which, as previously explained in conjunction with FIG. 2, serves as the telephony output means for the baseband terminal station BT*n*+1. The band-pass frequency $F_1$ output of the separation filter means is connected in the manner illustrated in FIG. 3 to frequency converter means 25. The frequency converter means 25 illustrated in FIG. 3 may take any conventional form of frequency converter device which acts upon an input signal having a first preselected frequency, here indicated as $F_1$, to produce an output signal representative of said input signal whose frequency occupies a second frequency range indicated herein by $F_4$. The output of the frequency converter means 25 is applied to the portion of the baseband terminal station BT*n*+1 associated with the radio channels CH4 and CH5 which are directed for the transmission of telephony signals in a direction from the baseband terminal station BT*n*+1 toward the baseband terminal station BT*n*. As shall be seen hereinafter, the band-pass frequency $F_1$ output of the separation filter means 24 and hence the output frequency $F_4$ of the frequency converter means 25 applied to the portion of the baseband terminal station BT*n*+1 associated with the radio channels CH4 and CH5 is representative of the telephony signals propagating in the radio channel CH1 or CH3 and hence may be considered to constitute the branched out telephony signals.

The embodiment of the present invention illustrated in FIG. 3 additionally includes a telephony signal radio channel CH5 and a spare radio channel CH4 directed for information transmission from the baseband terminal station BT*n*+1 to the baseband terminal station BT*n*. Furthermore, as television signals are rarely transmitted from a small city, represented by the baseband terminal station BT*n*+1, to a large city, represented by the baseband terminal station BT*n*, high signal to noise ratios may be obtained and no television signal radio channel is present for transmission in this direction whereby the spare radio channel CH4 may be considered as reserved solely for telephony signals and no control network is required to control the type of signals applied to said spare radio channel CH4. Consequently, the baseband terminal station BT*n*+1 is provided for the transmission of telephony signals in a direction toward the baseband terminal station BT*n* with circuit means comprising telephony signal input terminal means Tel-in, combining filter means 26, FM modulator means $M_{28}$ and $M_{27}$ for each of said radio channels CH4 and CH5 and heterodyne transmitter means $T_{30}$ and $T_{28}$ for each of said radio channels CH4 and CH5. The telephony signal input terminal means Tel-in is adapted in the well-known manner to receive multiplex telephony signals having a frequency bands equal to $F_2$ and $F_6$ for transmission in a direction from the baseband terminal station BT*n*+1 toward the baseband terminal station BT*n*. The telephony signal input terminal means Tel-in is connected to a first input of the combining filter means 26, while a second input of said combining filter means 26 is connected to the output of the frequency converter means 25. The combining filter means 26 may comprise any conventional device capable of accepting first and second input signals, having separate and distinct frequency bands as applied thereto and providing at an output thereof a composite signal representative of said first and second input signals superimposed on upon the other. Thus, under the conditions illustrated in FIG. 3, the combining filter means 26 receives the output signal of the frequency converter means 25 having a frequency F4 at a first input thereto and the telephony signals applied to the telephony signal input terminal means Tel-in, having a frequency bands F2 and F6 at a second input thereto so that the output of said combining filter means comprises each of said signals wherein one of each signal is superimposed upon the other. The output of said combining filter means 26 is applied to each of said FM modulator means $M_{28}$ and $M_{27}$ which form the initial stages of the portion of the baseband terminal station BT*n*+1 associated with the radio channels CH4 and CH5, respectively. As the FM modulator means $M_{28}$ and $M_{27}$ and the heterodyne transmitter means $T_{30}$ and $T_{29}$ are connected in the same manner and perform the same function as their counterparts in the radio relay system illustrated in FIG. 2 and described above further discussion thereof as here considered unnecessary.

The portions of the leak-insertion station $IT_2$ associated with the spare radio channel CH4 and the telephony signal radio channel CH5 are arranged to complement the transmitting counterpart thereof at the baseband terminal station BT*n*+1. Accordingly, the leak-insertion station $IT_2$ includes heterodyne receiver means R and heterodyne transmitter means T associated with each of the radio channels CH4 and CH5 whereby information being transmitted in each of said radio channels CH4 and CH5 may be received at said leak-insertion station $IT_2$ and thereafter retransmitted in the appropriate radio channel CH4 or CH5 toward the baseband terminal station BT*n*. In addition, since the leak-insertion station $IT_2$ is to include insertion and branching out capabilities, branching circuitry is provided for branching out telephony signals received at said leak-insertion station $IT_2$ from said baseband terminal station BT*n*+1 and from said baseband terminal station BT*n* and insertion circuitry is provided so that telephony signals may be inserted at said leak-insertion station $IT_2$ and transmitted therefrom so as to be made available at said baseband terminal station BT*n* or said baseband terminal station BT*n*+1. The branching out circuitry provided at said leak-insertion station $IT_2$, and associated with the radio channels CH4 and CH5 comprises FM detector means $D_{32}$ and $D_{33}$ initiator means $I_{34}$, switch means $SW_{35}$, and branching filter means 43. The FM detector means $D_{32}$ and $D_{33}$, the initiator means $I_{34}$, and the switch means $SW_{35}$ may take the same form, perform the same function and are interconnected in the same manner as was described above with regard to their corresponding elements depicted in FIG. 2. The output of the switch means $SW_{35}$, which therefore contains superimposed telephony signals whose respective frequencies are $F_2$ and $F_4$ as derived from either the radio channel CH5 or CH4 as determined by the state of the initiator means $T_{34}$, is applied to the input of the branching filter means 43. The branching filter means 43 may comprise any conventional form of multiple band-pass filter means capable of separating an input signal applied thereto according to two specific frequency bands which in this case comprise the frequency bands $F_2$ and $F_4$. The $F_4$ output of the branching filter means 43 is applied to the output terminal means $DR_1$ while the $F_2$ output of the branching filter means 43 is connected to the output terminal means $DR_2$. As will be manifest hereinbelow, since telephony signals having the frequency band $F_4$ are representative of signals branched out of the spare radio channel CH1 or signals branched out of the telephony signal radio channel CH3 at the leak-insertion station $IT_2$ and telephony signals having the frequency band $F_2$ are representative of telephony signals being transmitted from the baseband terminal station BT*n*+1 toward the baseband terminal station BT*n*, the same branched out telephony signals will be available at the output terminal means $DR_1$ and $DR_2$ as were available at the output terminal means having the same designations in FIG. 2.

The insertion circuitry in the embodiment of the invention illustrated in FIG. 3 associated with the radio channels CH4 and CH5 at the leak-insertion station $IT_2$ comprises input terminal means $IS_1$ and $IS_2$, combining filter means 45, and FM modulator means $M_{38}$ and $M_{39}$. The input terminal means $IS_1$ is adapted to receive input telephony signals having a frequency band $F_1$ destined for insertion at said leak-insertion station $IT_2$ and for further transmission therefrom to said baseband terminal station BT*n*. In contradiction thereto, the input terminal means $IS_2$ is adapted to receive input telephony signals having a frequency band $F_3$ for insertion at said leak-insertion station $IT_2$ and for further transmission therefrom to said baseband terminal station BT*n*+1. The input terminal means $IS_1$ and $IS_2$ are connected to the inputs of the combining filter means 45 adapted to pass telephony signals whose frequency bands reside at $F_1$ and $F_3$, respectively, as indicated in FIG. 3. The output of the combining filter means 45 is applied to each of said FM modulator means $M_{38}$ and $M_{39}$. As the function, character and interconnection of the FM modulator means $M_{38}$ and $M_{39}$ were described in conjunction with the mixer inputs to the heterodyne transmitter means T for each radio channel CH4 and CH5 in detail in conjunction with FIG. 2, their mode of operation will not be further described.

The portions of the baseband terminal station BT$n$ associated with the radio channels CH4 and CH5 are arranged to complement the transmitting portion of the leak-insertion station $IT_2$. Accordingly, each portion of the baseband terminal Station BT$n$ comprises heterodyne receiver means R associated with each of the radio channels CH4 and CH5, FM detector means D associated with each of said radio channels CH4 and CH5, initiator means $I_{40}$, switch means $SW_{41}$, separation filter means 48 and telephony signal output terminal means Tel-out. The heterodyne receiver means R, the detector means D, the initiator means $I_{40}$ and the switch means $SW_{41}$ are interconnected and perform the same functions as were described anent these elements in the discussion of FIG. 2. The output of the switch means $SW_{41}$ is connected to the input of the separation filter means. The separation filter means may take the same form and perform the same function as the separation filter means 24 described above; however the passband thereof is selected to be at the frequency band $F_3$. Thus it will be seen that all of the frequency bands present in the input to the separation filter means 48 will be rejected and hence by applied to the telephony signal output terminal means Tel-out connected to the rejection output thereof, except telephony signals having a frequency band $F_3$. The telephony signals having a frequency band $F_3$, as originally applied at the input terminal means $IS_2$ of the leak-insertion station $IT_2$, are applied from the pass band output of said separation filter means 48 to the input of the frequency converter means 49. The frequency converter means 49 may be conventional and is adapted to convert the input signals applied thereto at the frequency band $F_3$ to the frequency band $F_2$. The output of the frequency converter means 49 is applied directly to the telephony signal input line associated with radio channel $CH_3$; however, as will be obvious to those of ordinary skill in the art, such application could be through one input of a combining filter means. Therefore it will be seen that the radio relay system embodied in FIG. 3 requires no insertion or branching expedients associated directly with the radio channels CH1—CH3 at the leak-insertion station $IT_2$ or the equivalents thereof and hence a marked reduction over the apparatus required by a conventional radio relay system such as that illustrated in FIG. 2 has been achieved.

In the discussion of the embodiment of the radio relay system illustrated in FIG. 3 which follows, it will be initially assumed that no failure or malfunction has occurred in any of the radio channels CH1—CH5. Further, it is also assumed that television signals for transmission from the baseband terminal station BT$n$ toward the baseband terminal station BT$n$+1 are applied to the television signal input terminal means TV-in at the baseband terminal station BT$n$, that multiplexed telephony signals having a frequency band $F_1$ and $F_5$ for transmission from the baseband terminal station BT$n$ toward the baseband terminal station BT$n$+1 are applied to the telephony signal input terminal means Tel-in located at the baseband terminal station BT$n$, that multiplexed telephone signals having a frequency band $F_3$ for insertion into the multiplexed telephony signals being transmitted from the baseband terminal station BT$n$ toward the baseband terminal station BT$n$+1 are applied to the input terminal means $IS_2$ located at the leak-insertion station $IT_2$, that multiplexed telephony signals having a frequency $F_2$ and $F_6$ for transmission from the baseband terminal station BT$n$+1 to the baseband terminal station BT$n$ are applied to the telephony signal input terminal means Tel-in located at the baseband terminal station BT$n$+1 and that multiplexed telephony signals having a frequency band $F_1$ for insertion into the multiplexed telephony signals being transmitted from the baseband terminal station BT$n$+1 to the baseband terminal station BT$n$ are applied to the input terminal means $IS_1$ located at the leak-insertion station $IT_2$. Accordingly, when these conditions obtain the television signals applied to the television signal input terminal means TV-in are applied to the modulator means M present in the portion of the baseband terminal station BT$n$ associated with the radio channel CH2. Thereafter, the television signals applied to the television signal input terminal means TV-in will be transmitted along the radio channel CH2 in the precise manner previously described above in conjunction with FIG. 2. Therefore, it will be seen that under the initial conditions stated above, television signals applied to the television signal input terminal means TV-in are transmitted through the radio channel CH2 and are available at the television signal output terminal means TV-out located at the baseband terminal station BT$n$+1.

The multiplexed telephony signals having a frequency band $F_1$ applied to the telephony signal input terminal means Tel-in, located at the baseband terminal station BT$n$, will be mixed with multiplexed telephony signals having a frequency band $F_2$ applied to the input line of such telephony signal input terminal means Tel-in by the frequency converter means 49. The manner in which said frequency converter means 49 receives input signals for conversion into the frequency band $F_2$ will be described hereinafter; however, at this point in the description of the embodiment of the invention illustrated in FIG. 3, it is only necessary to appreciate that the $F_2$ telephony input signals are superimposed upon the $F_1$ and $F_5$ telephony input signals applied to the telephony signal input terminal means present in the baseband terminal station BT$n$. Under the conditions stated above, the composite signal comprising the superimposed $F_1$, $F_2$, and $F_5$ telephony signals are applied to the input of the FM modulator means M present in the portion of the baseband terminal means BT$n$ associated with the radio channel CH3. The superimposed telephony signals are transmitted directly through the radio channel CH3 since no branching or insertion takes place at the portion of the lead-insertion station $IT_2$ between the heterodyne receiver means $R_4$ and the heterodyne transmitter means $T_{15}$ as no circuitry therefor is here provided. Accordingly, the superimposed, multiplexed telephony signals, after direct transmission through the radio channel CH3, are present at the output of the switch means $SW_{22}$ as under the initial conditions stated above, the switch means $SW_{22}$, as controlled by the initiator means $I_{21}$ is in a condition to apply the output of the FM detector means $D_{19}$ to the output thereof. The output of the switch means $SW_{22}$ is coupled to the separation filter means 24 whereby the superimposed multiplexed telephony signals applied thereto are separated according to the frequency bands present therein. Accordingly, as the band-pass frequency of the separation filter means 24 has been preselected to reside at $F_1$, all of the frequency bands present in the output of the switch means $SW_{22}$ which do not reside at such frequency band $F_1$ are rejected and hence applied to the telephony signal output terminal means Tel-out located at the baseband terminal station BT$n$+1. Thus, multiplexed telephony signals having frequency bands $F_2$ and $F_6$ transmitted toward said baseband terminal station BT$n$+1 are made available at the telephony signal output terminal means Tel-out.

In contradistinction thereto, the portion of the output signal of the switch means $SW_{22}$ which resides within the frequency band $F_1$ is passed by said separation filter means 24 and is thus applied to the input of the frequency converter means 25. As the portion of the output signal of the switch means $SW_{22}$ containing the frequency band $F_1$ comprises essentially the multiplexed telephony signals applied at said baseband terminal station BT$n$ to said telephony signal input terminal means Tel-in, it will be seen that the portion of the output signal of the switch means $SW_{22}$ passed by said separation filter means constitutes the same signal which would be branched out of the leak-insertion station $IT_2$ if the telephony input signals having frequency band $F_1$ were applied solely thereto and branching circuitry was provided therefor. Accordingly, the output of the separation filter means 24 applied to said frequency converter means 25 is representative of multiplexed telephony signals being transmitted from the baseband terminal station BT$n$ toward said baseband terminal station BT$n$+1 as would be branched out from said leak-insertion station $IT_2$ in FIG. 2. The frequency converter means 25 acts as previously mentioned to convert an input signal applied thereto, having a frequency band $F_1$, into an output signal having a frequency band $F_4$. However, although the frequency coding of the telephony signals applied to said frequency converter means 25 has been changed thereby, the character of the multiplexed telephony signals represented remains unchanged. Thus, the output of the frequency converter means 25 is representative of multiplexed telephony signals which would be branched out of said leak-insertion station $IT_2$ from the radio channel $CH_3$ if single frequency band telephony signals were being transmitted therein. The output of the frequency converter means 25 is applied as a first input to the combining filter means 26 at a portion thereof whose band-pass frequency is designed to pass the frequency band $F_4$ thereof.

The telephony signal input terminal means Tel-in located at the baseband terminal station BT$n$+1 and associated with the radio channels CH4 and CH5 receives, under the foregoing conditions, multiplexed telephony signals having a frequency bands $F_2$ and $F_6$ which are adapted for transmission in a direction from the baseband terminal BT$n$+1 toward the baseband terminal station BT$n$. The telephony signals having the frequency bands $F_2$ , and $F_6$ as applied to the telephony signal input terminal means Tel-in at the baseband terminal station BT$n$+1 are coupled to the second input of the combining filter means 26. Accordingly, the combining filter means 26 receives first and second telephony signal inputs applied thereto having the frequency bands $F_4$ and $F_2$ and $F_6$, and produces in response thereto an output signal which constitutes one of said input signals superimposed on the other of said input signals. The output of said combining filter means 26 is applied to the inputs of each of said modulator means $M_{27}$ and $M_{28}$ whereby said superimposed multiplexed telephony signals are transmitted toward the baseband terminal station BT$n$ in each of said radio channels CH4 and CH5 in the manner described above in conjunction with FIG. 2. The superimposed output signals having frequency band $F_6$ transmitted in each of said radio channels CH4 and CH5 are received at the leak-insertion station $IT_2$ by the heterodyne receiver means R and are further applied therein to the heterodyne transmitter means T in precisely the same manner set forth above in regard to the conventional radio relay system of FIG. 2. Furthermore, the multiplexed telephony signals having frequency bands $F_2$ and $F_4$ present in the radio channels CH4 and CH5 and hence received at said leak-insertion station $IT_2$ are branched out from said radio channels CH4 and CH5 due to the action of the FM detector means $D_{32}$ and $D_{33}$, the initiator means $I_{34}$ and the switch means $SW_{35}$ in the same manner as was described for the corresponding circuit means illustrated in FIG. 2. Thus, under the conditions stated above wherein no failure has occurred in the telephony signal radio channel CH5, the output of the detector means $D_{33}$ will be available at the output of the switch means $SW_{35}$ which functions under the control of the initiator means 34. However, in contradistinction to the conventional radio relay system illustrated in FIG. 2, the branched out signals available at the output of the switch means $SW_{35}$ comprises at least two superimposed multiplexed telephony signals occupying the frequency bands $F_4$ and $F_2$, respectively. Therefore, as the multiplexed telephony signals occupying the frequency band $F_4$ are representative of multiplexed telephony signals branched out at a point occupied by the leak-insertion station in the transmission path of telephony signals directed from the baseband terminal station BT$n$ toward the baseband terminal station BT$n$+1 while the multiplexed telephony signals occupying the frequency band $F_2$ are representative of multiplexed telephony signals branched out at a point occupied by the leak-insertion station $IT_2$ in the transmission path of input telephony signals directed from the baseband terminal station BT$n$+1 toward the baseband terminal station BT$n$; each of the desired branched out telephony signals is available at the output of the switch means $SW_{35}$. Accordingly, as both the desired branched output signals are present at the output of the switch means $SW_{35}$ in the form of at least two frequency coded superimposed multiplexed telephony signals, each of the desired branched out, multiplexed telephony signals may be obtained therefrom. Thus, in the embodiment of the invention illustrated in FIG. 3, the output of the switch means $SW_{35}$ is connected to the input of the branching filter means 43. The branching filter means 43 is adapted to separate the input signal applied thereto upon the basis of at least two pass bands included therein and here indicated as $F_4$ and $F_2$. The $F_4$ output of the branching filter means 43 is coupled to the output terminal means $DR_1$ while the $F_2$ output thereof is coupled to the output terminal means $DR_2$. Thus, it will be seen that the same branched out multiplexed telephony signals are obtained from the output terminal means $DR_1$ and $DR_2$ in the embodiment of the invention illustrated in FIG. 3 as were obtained in the conventional radio relay system illustrated in FIG. 2; however, in the embodiment of the invention illustrated in FIG. 3 the branching circuitry required in FIG. 2 to be directly associated with the radio channels CH1 and CH3 has been entirely eliminated.

Under the initial conditions stated above, multiplexed telephony signals having a frequency band $F_3$ are applied to the input terminal means $IS_2$ located at the leak-insertion station $IT_2$ for insertion into the multiplexed telephony signals being transmitted from the baseband terminal station BT$n$ toward the baseband terminal station BT$n$+1 and multiplexed telephony signals having a frequency band $F_1$ are applied to the input terminal means $IS_1$ located at the leak-insertion station $IT_2$ for insertion into the multiplexed telephony signals being transmitted from the baseband terminal station BT$n$+1 toward the baseband terminal station BT$n$. The multiplexed telephony signals applied to the input terminal means $IS_1$ and the multiplexed telephony signals applied to the input terminal means $IS_2$ are coupled to the respective inputs of the combining filter means 45 whose pass bands are adapted to pass such inputs. Thus, as shown in FIG. 3, the input terminal means $IS_2$ is coupled to the BPF–$F_3$ input of the combining filter means 45 while input terminal means $IS_1$ is coupled to the BPF–$F_1$ input thereof. The combining filter means 45 therefore acts to produce an output signal which comprises each of the multiplexed input signals applied thereto, which input signals are superimposed one upon the other. The output of the combining filter means 45, which comprises the two multiplexed telephony signals superimposed upon each other, is coupled to each of the FM modulator means $M_{38}$ and $M_{39}$ at the inputs thereto. Accordingly, the FM modulator means $M_{38}$ and $M_{39}$ act in conjunction with the mixer inputs of the heterodyne transmitter means T associated with the radio channels CH4 and CH5 to insert the output of the combining filter means 45 into the radio channels CH4 and CH5 in the same manner as was explained in regard to the conventional radio relay of FIG. 2.

The multiplexed telephony signals transmitted by each of the heterodyne transmitter means T present in the portions of the leak-insertion station $IT_2$ associated with radio channels CH4 and CH5 will be received at the baseband terminal station BT$n$ and selectively applied to the output of the switch means 41 therein in the same manner as was described above in connection with FIG. 2. Under the conditions stated above, wherein no failure or malfunction is present in the telephony radio channel CH5, the switch means $SW_{41}$ will act under the control of the initiator means 40 to apply the telephony signals present in the radio channel CH5 to the output thereof which is connected to the input of the separation filter means 48. The separation filter means 48 acts in response to the multiplexed telephony signals applied to the input thereof to pass to its pass band output all such signals within the frequency band $F_3$ while all such telephony signals residing within other frequency bands are applied to the rejection output thereof. Accordingly, as the only multiplexed telephony signals which reside within the frequency band $F_3$ are those applied to the input terminal means $IS_2$ located at the leak-insertion station $IT_2$, the multiplex signals available at the rejection output of the separation filter means 48 and applied thereby to the telephony output terminal means Tel-out will include both the multiplexed telephony signals introduced at the frequency band $F_6$ to the telephony signal input terminal means Tel-in located at the baseband terminal station BT$n$+1 and the multiplexed telephony signals introduced at the frequency band $F_1$ to the input terminal means $IS_1$ located at the leak-insertion station $IT_2$. Furthermore, since the only multiplexed telephony signals residing within the frequency band $F_3$ and hence passed to the pass band output of the separation filter means 48 are those applied at the input terminal means $IS_2$ of the leak-insertion station $IT_2$, only signals for insertion in the telephony signals being transmitted from the baseband terminal station BT$n$ toward the baseband terminal station BT$n$+1 are applied to the input of the frequency converter means 49. The multiplexed telephone signals in the frequency band $F_3$ as applied at the input of the frequency converter means 49 will be converted thereby into multiplexed telephony signals having a frequency band $F_2$ and are thereafter superimposed with the $F_1$ and $F_5$ telephony signals applied to the telephony signal input terminal means Tel-in located at the baseband terminal station BT$n$ in the manner mentioned above. Therefore, it will be seen that multiplexed telephony signals applied to the input terminal means $IS_2$ are inserted with the telephone signals introduced at the telephony signal input terminal means Tel-in located at the baseband terminal station BT$n$ for transmission in a direction from the baseband terminal station BT$n$ toward the baseband terminal station BT$n$+1 while multiplexed telephony signals introduced at the input terminal means $IS_1$ are transmitted toward the baseband terminal station BT$n$ and made available at the telephony signal output terminal means Tel-out located at said baseband terminal station BT$n$. Thus, the same requisite insertion of multiplexed telephony signals is carried out in the embodiment of the invention illustrated in FIG. 3 as was accomplished in the conventional system depicted in FIG. 2; however, the embodiment of the invention illustrated in FIG. 3 requires none of the insertion apparatus relied upon in FIG. 2 for the insertion of telephony signals in the radio channels CH3 or CH1.

If it is now assumed that a failure or malfunction has occurred in the television signal channel CH2, it will be appreciated that the failure is detected by the initiator means $I_{21}$ which controls the switch means $SW_{11}$ through the control network formed by the control transmitter means CT and the control receiver means CR so that television signals applied to the television input terminal means TV-in are applied to the spare radio channel CH1 in the manner described above for FIG. 2. Similarly, the switch means $SW_{23}$ acts under the control of the initiator means $I_{21}$ to apply the output of the spare radio channel CH1 to the television output terminal means TV-out in the manner specified above. However, in the case of the embodiment of the invention illustrated in FIG. 3 no initiator means, such as the initiator means illustrated as $I_8$ in FIG. 2, or the various switch means therefor, is necessary to prevent telephony signals from being inserted in the spare radio channel CH1 when television signals are being transmitted therein because all telephony signals inserted for transmission from the baseband terminal station BT$n$ toward the baseband terminal station BT$n$+1 are introduced at a point in the baseband terminal station BT$n$ in the vicinity of the telephony signal input terminal means Tel-in therefor and hence may be inserted into the spare radio channel CH1 only with the other telephony signals being transmitted toward the baseband terminal station BT$n$+1. Thus, as such insertion of telephony signals into the spare radio channel $CH_1$ occurs only pursuant to the controlled action of switch means $SW_{11}$, which must of necessity be in a different controlled condition as television signals are being transmitted in the spare radio channel CH1, the embodiment of the present invention illustrated in FIG. 3 is incapable of inserting telephony signals into a television signal carrying radio channel.

When a failure or malfunction occurs in the radio channel CH3, while the remainder of the radio channels CH1, CH2, CH4 and CH5 are operating normally, this failure will be detected by the initiator means $I_{21}$ which thereby also controls the switch means $SW_{11}$ and $SW_{22}$ so that the telephony signals normally transmitted in the radio channel CH3 are transmitted over and received from the spare radio channel CH1 in the same manner as was described in conjunction with FIG. 2. However, it should again be noted that as the multiplexed telephony signals for insertion into telephony signals being transmitted from the baseband terminal station BT$n$ toward the baseband terminal station BT$n$+1 are introduced at a point in the baseband terminal station BT$n$ in the vicinity of the telephony signal input means Tel-in, no additional initiator means, such as $I_8$ as utilized in FIG. 2, or the switching means therefor is necessary to accomplish the requisite insertion.

If it is now assumed that a malfunction failure occurs in the telephony signal radio channel CH5, the various telephony information transmitted thereover will be switched to and received from the spare radio channel CH4. This action is here achieved due to the action of the switch means $SW_{35}$ and $SW_{41}$ as controlled by the initiator means $I_{34}$ and $I_{40}$, respectively, in the manner described above for the radio relay system illustrated in FIG. 2. Furthermore, if a failure should occur simultaneously in both the radio channels CH2 and CH3, priority for the use of the spare radio channel CH1 by the multiplexed telephony signals may be readily provided as is common in conventional radio relay systems.

Therefore, it will be seen that a radio relay system has been provided in accordance with the teachings of the present invention wherein it is not possible for television signals to be distorted by the superpositioning of multiplexed telephony signals thereon and, in addition thereto, a substantial saving in the apparatus normally required for such a radio relay system has been achieved.

Although the present invention has been illustrated in conjunction with the single embodiment of FIG. 3 wherein only one radio channel was assigned for each of the multiplexed telephone and television signals for transmission in a first direction, only the multiplexed telephony signals are transmitted in a second direction and only one spare radio channel was provided in each direction, it will be appreciated by those of ordinary skill in the art that the present invention is of general application. Thus, if $n$ and $m$ stand for arbitrary integers, a radio relay system according to the present invention may be designed wherein $n$ radio channels are provided for telephony signals, $m$ radio channels are provided for television signals and one spare radio channel directed for transmission in one direction is provided. Accordingly, if this arrangement is employed, it would be sufficient to provide only specified telephony radio channels and the spare radio channel with telephonic leak-insertion capabilities because an intermediate leak-insertion station requires only a small number of telephony, speech channels. Therefore, in this arrangement, the present invention would be practiced in the manner described above with the exception that such one spare radio channel would be available commonly for each of the plurality of other radio channels, $n$ or $n+m$ in number.

In addition, in radio relay systems according to the present invention, the transmission of television signals may be made bidirectional. Thus, if a video signal is to be transmitted from a baseband terminal station BT$n$+1 to a baseband terminal station BT$n$ through a spare radio channel, additional means must be provided to intercept the introduction of telephony signals for insertion so that distortion of the television signals being transmitted is prevented when said television signals are present in the spare radio channel. However, despite the introduction of this additional means, the overall radio relay system according to the present invention is substantially simplified when compared to those provided by the prior art.

Further, although the embodiment of this invention illustrated in FIG. 3 has been shown as including only one leak-insertion station interposed between a pair of baseband terminal stations, it will be obvious to those of ordinary skill in the art that further leak-insertion stations may be included therein. Thus, in such a multileak-insertion station system, local transmission or telephony or television signals would take place in such a manner that the designated information signal would be initially transmitted to one of the baseband terminal stations, and thereafter, to the desired leak-insertion station through a frequency conversion process. Furthermore, the present invention is applicable to a party-line frequency allocation system wherein many combinations of a pair of baseband terminal stations and many leak-insertion stations may be relied upon.

As has been described, the present invention allows for the substantial structural simplification of the leak-insertion stations in the radio relay systems contemplated thereby as well as insuring that television signals being transmitted in the spare radio channel can not be distorted by the superimposing of modulated telephony signals thereon. Thus, as a result of the substantial simplification of the overall radio relay system, maintenance and operation of the radio relay system contemplated by this invention are favorably improved over those conventionally available. Furthermore, although the radio relay system according to the present invention requires the use of additional frequency bands such as $F_3$ and $F_4$, the advantages of the instant invention far outweigh any inconveniences caused thereby.

While the invention has been described in connection with an exemplary embodiment thereof, it will be understood that many modifications will be readily apparent to those of ordinary skill in the art; and that this application is intended to cover any adaptations or variations thereof.

We claim:

1. A radio relay system, comprising:

first and second terminal stations and an intermediate station therebetween;

first channel means constituting a first spare channel means for transmitting one of telephony and television signals from said first station through said intermediate station to said second station;

second channel means for transmitting a television signal $F_t$ and a pilot signal from said first station through said intermediate station to said second station;

third channel means for transmitting a first telephony signal $F_1$, a first telephony signal $F_2$ and a pilot signal from said first station through said intermediate station to said second station;

selective switching means responsive to said pilot signals in said second and third channel means at second station for normally applying said signal $F_t$ from said second channel means to a first output terminal of said second station, said first signal $F_2$ from said third channel means to a second output terminal of said second station and branching out said first signal $F_1$ at said second station; said selective switching means responsive to a failure of said pilot signal in one of said second and third channel means for substituting said first spare channel means for said one channel means and applying from said first spare channel means at said second station signals corresponding to signals transmitted in said one channel means;

means at said second station for converting said branched out telephony signal $F_1$ into a telephony signal $F_4$;

A fourth channel means and a fifth channel means having joined ends at said second station for transmitting telephony signals from said second station through said intermediate station to said first station;

selective signal means at said second station for applying to said fourth and fifth channel means joined ends said signal $F_4$, a second telephony signal $F_2$ from an input terminal of said second station, and a pilot signal;

selective signal means at said intermediate station for inserting a second telephony signal $F_1$ and a telephony signal $F_3$ into both said second spare channel means and said fifth channel means;

selective switching means responsive to said pilot signal in said fifth channel means at said first station for normally applying said second signals $F_1$ and $F_2$ to an output terminal of said first station and to branch out said signal $F_3$; said last-mentioned switching means responsive to a failure of said pilot signal in said fifth channel means to substitute said second spare channel means for said fifth channel means at said first station;

means at said first station to convert said branched out signal $F_3$ thereat into said first signal $F_2$ for transmission in said third channel means; and selective switching means responsive to said pilot signal in said fifth channel means at said intermediate station for normally branching out said second signal $F_2$ and said signal $F_4$ to respective output terminals at said intermediate station, and further responsive to a failure of said pilot signal in said fifth channel means for substituting said second spare channel means for said fifth channel means to branch out said second signal $F_2$ and said signal $F_4$ from said second spare channel means to said respective last-mentioned terminals.

2. The system according to claim 1 in which said selective switching means responsive to said pilot signals at said second station includes:

first and second switching means;

filter means; and control means; said control means responsive to said pilot signals in said second channel means to normally actuate said first switching means to apply said signal $F_t$ from said second channel means to said second station first output terminal and further responsive to said pilot signal in said third channel means to normally activate said second switching means to apply said signal $F_2$ through said filter means to said second station second output terminal and to normally branch out said signal $F_1$ from said filter means.

3. The system according to claim 2 in which said selective switching means responsive to said pilot signals at said second station includes:

other switching means normally in an open condition at said first spare channel means and at said second and third channel means in said first station; and alarm means interconnecting said other switching means and said last-mentioned selective switching means; said last-mentioned selective switching means in response to said failure of said pilot signal in said one of said second and third channel means producing a first alarm signal to activate one of said first and second switching means to a connection with said first spare channel means and to a disconnection with said one channel means having said pilot signal failure in correspondence with said last-mentioned channel means; said last-mentioned selective switching means further in response to said pilot signal failure in said one of said second and third channel means producing a second alarm signal to activate said other switching means to a closed condition to connect said one channel means having said pilot failure therein to said first spare channel at said fist station, thereby substituting said first spare channel means for said one channel means having said pilot failure.

4. The system according to claim 3 in which said one channel means having pilot signal failure comprises said second channel means; said activated one switching means comprising said first switching means for connecting said last-mentioned means to said first spare channel means and disconnecting said first switching means from said second channel means at said second station; said other switching means activated by said second alarm signal to said closed condition to connect said one channel means comprising said second channel means to said first spare channel means at said first station, thereby substituting said first spare channel means for said second channel means.

5. The system according to claim 3 in which said one channel means having said pilot failure comprises said third channel means; said activated one switching means comprising said second switching means for connecting said last-mentioned means to said first spare channel means and disconnecting said second switching means from said third channel means at said second station; said other switching means activated by said second alarm signal to said closed condition to connect said one channel means comprising said third channel means to said first spare channel means at said first station, thereby substituting said first spare channel means for said third channel means.

6. The system according to claim 1 in which said selective switching means at said second station includes filter means for passing said first signal $F_2$ to said second output terminal at said second station and branching out said first signal $F_1$ at said second station.

7. The system according to claim 1 in which said selective switching means at first station includes:

switching means;

control means; and filter means; said control means energized by said pilot signal in said fifth channel means at said first station to actuate said switching means to connect to said fifth channel means to normally apply said second signals $F_1$ and $F_2$ from said fifth channel means through said filter means to said first station output terminal and to normally branch out said signal $F_3$ from said fifth channel means through said filter means; said control means responsive to a failure of said pilot signal in said fifth channel means at said first station to activate said switching means to disconnect from said fifth channel means and to connect to said second spare channel means at said first station to apply said second signals $F_1$ and $F_2$ from said second spare channel through said filter means to said first station output terminal and to branch out said signal $F_3$ from said second spare channel means through said filter means.

8. The system according to claim 1 in which said selective switching means at said intermediate station includes:

switching means;

control means; and filter means; said control means energized by said pilot signal in said fifth channel means to activate said switching means to connect to said fifth channel means to normally branch out said second signal $F_2$ and said signal $F_4$ from said fifth channel means through said last-mentioned switching means and said filter means to said respective output terminals at said intermediate station; said control means responsive to a failure of said pilot signal in said fifth channel means to actuate said switching means to disconnect from said fifth channel means and to connect to said second spare channel means to branch out said second signal $F_2$ and said signal $F_4$ from said second spare channel means through said filter means to said respective last-mentioned terminals.